(12) United States Patent
Araki et al.

(10) Patent No.: US 6,629,424 B1
(45) Date of Patent: Oct. 7, 2003

(54) AIR CONDITIONER FOR CAR AND INSTRUMENT PANEL MODULE

(75) Inventors: Daisuke Araki, Saitama (JP); Hideki Nagano, Saitama (JP); Eiji Yanagida, Saitama (JP); Kazuhisa Katchi, Saitama (JP); Akitoshi Noguchi, Saitama (JP); Tsutomu Nakamigawa, Saitama (JP); Katsuichi Yamamoto, Saitama (JP); Takehide Matsumoto, Higashimatsuyama (JP)

(73) Assignee: Zexel Valeo Climate Control Corporation, Osato-gun (JP)

( * ) Notice: Subject to any disclaimer, the term of this patent is extended or adjusted under 35 U.S.C. 154(b) by 31 days.

(21) Appl. No.: 10/204,098
(22) PCT Filed: Jun. 30, 2000
(86) PCT No.: PCT/JP00/04357
§ 371 (c)(1),
(2), (4) Date: Aug. 15, 2002
(87) PCT Pub. No.: WO01/34417
PCT Pub. Date: May 17, 2001

(30) Foreign Application Priority Data

Mar. 13, 2000 (JP) ........................................ 2000-01501

(51) Int. Cl.$^7$ ............................................... B60H 1/32
(52) U.S. Cl. ........................................................ 62/244
(58) Field of Search ............................... 62/244; 165/42, 165/43; 280/93.515

(56) References Cited

U.S. PATENT DOCUMENTS

| | | | | |
|---|---|---|---|---|
| 4,146,244 A | * | 3/1979 | Presley | 180/428 |
| 4,320,909 A | * | 3/1982 | Nakamori et al. | 280/752 |
| 4,467,706 A | * | 8/1984 | Batcheller et al. | 454/70 |
| 5,042,567 A | * | 8/1991 | Kajimoto et al. | 165/42 |
| 5,217,405 A | * | 6/1993 | Tanaka | 454/121 |
| 5,234,246 A | * | 8/1993 | Henigue et al. | 296/70 |
| 5,265,668 A | * | 11/1993 | Fisher | 165/42 |
| 5,887,671 A | * | 3/1999 | Yuki et al. | 180/68.1 |
| 6,101,828 A | * | 8/2000 | Shikata et al. | 62/244 |
| 6,386,965 B1 | * | 5/2002 | Greenwald et al. | 454/75 |
| 6,409,590 B1 | * | 6/2002 | Suzuki et al. | 454/143 |
| 6,474,716 B2 | * | 11/2002 | Shikata et al. | 296/70 |
| 6,497,432 B2 | * | 12/2002 | Scheib et al. | 280/779 |

* cited by examiner

Primary Examiner—William E. Tapolcai
Assistant Examiner—Mohammad M. Ali
(74) Attorney, Agent, or Firm—Frishauf, Holtz, Goodman & Chick, P.C.

(57) ABSTRACT

A casing 1 of an automotive air conditioner is formed with a recess 12 for accommodating a steering member S extending in a right-left direction of a vehicle. The casing 1 is divided into an instrument panel-side part Rp and a fire panel-side part Fp with the recess 12 as a boundary S.

34 Claims, 28 Drawing Sheets

FIG.5
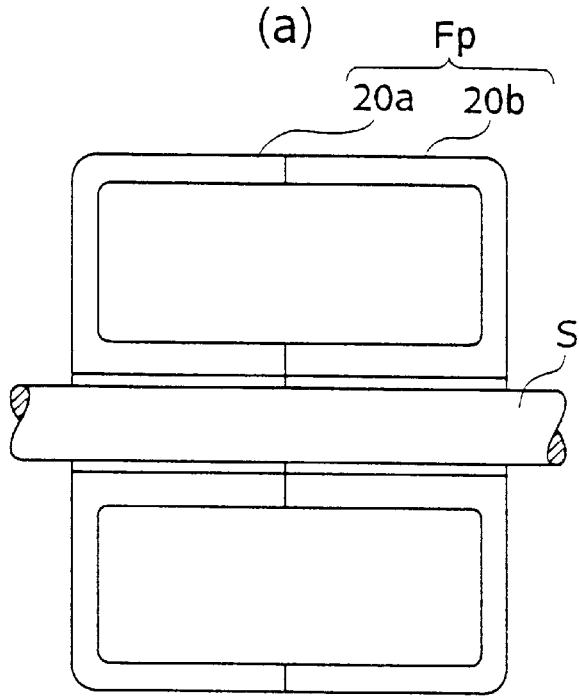
(a)
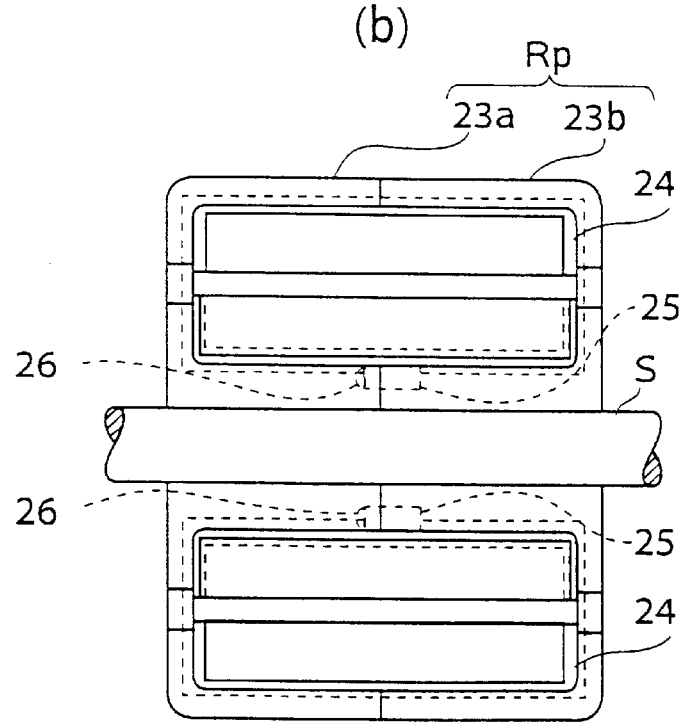
(b)

FIG. 6
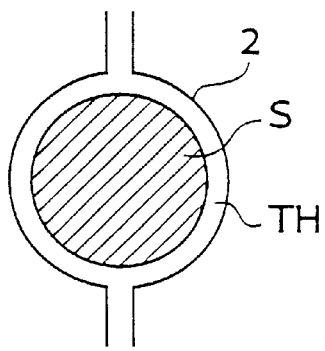
(a)
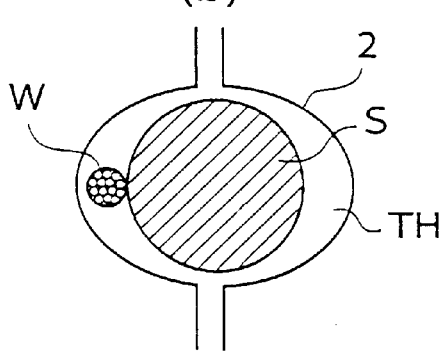
(b)
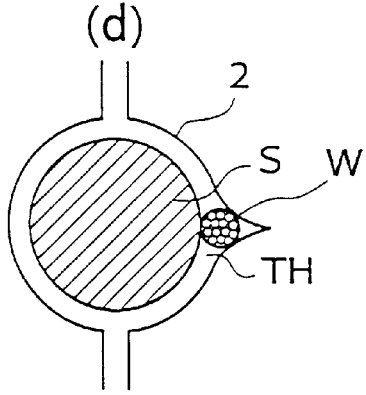
(d)
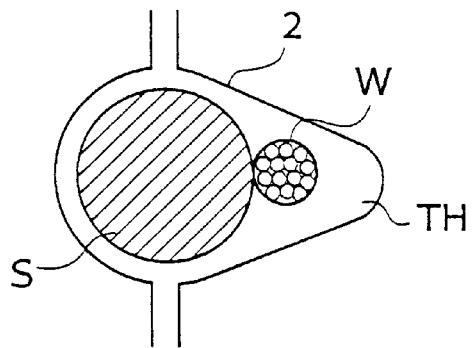
(c)
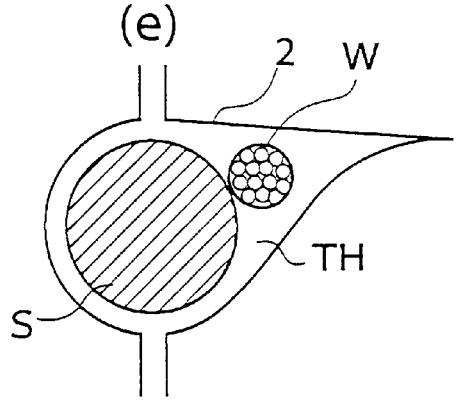
(e)

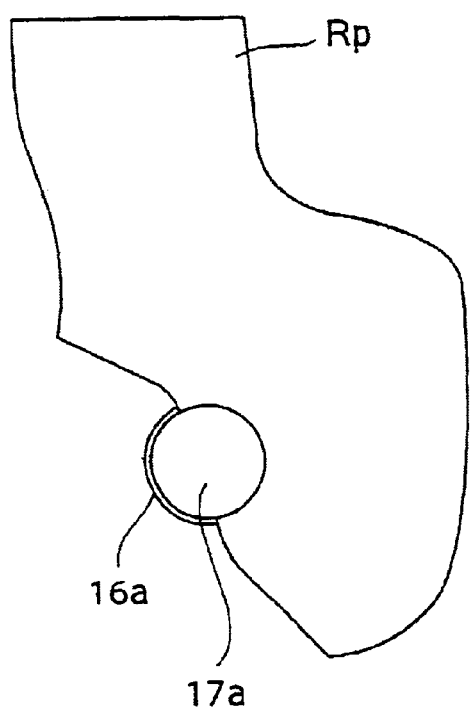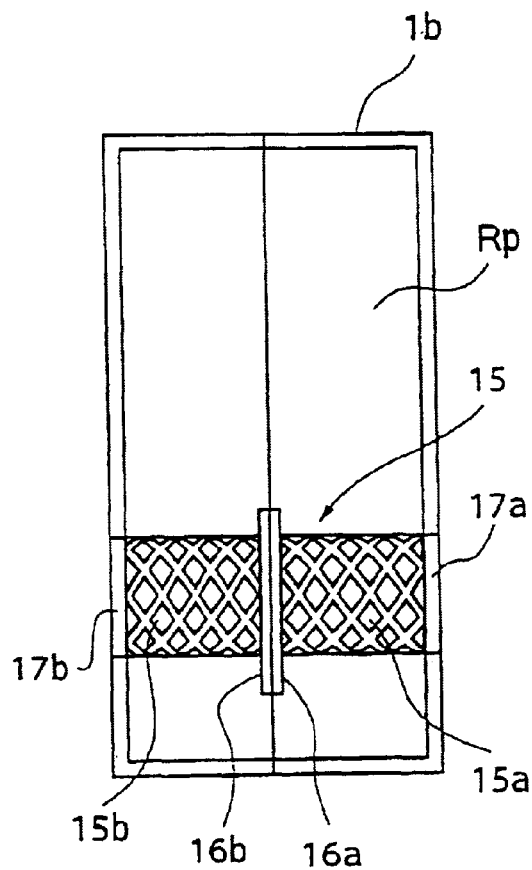
*FIG. 23(a)*  *FIG. 23(b)*

AIR CONDITIONER FOR CAR AND INSTRUMENT PANEL MODULE

This application is a U.S. National Phase Application under 35 USC 371 of International Application PCT/JP00/04357 Jun. 30, 2000.

TECHNICAL FIELD

This invention relates to an automotive air conditioner and an instrument panel module, and more particularly to an automotive air conditioner and an instrument panel module which can cope with a change in the location of a steering member.

BACKGROUND ART

FIG. 28 is a longitudinal cross-sectional view of a conventional automotive air conditioner.

This automotive air conditioner is arranged in a space defined by an instrument panel (not shown), a floor panel Fl, and a fire panel Fi.

The fire panel Fi divides between an engine room ER and a compartment R, while the floor panel forms the floor of the compartment R. The automotive air conditioner and the instrument panel are located within the compartment R.

A steering member S is located between the instrument panel and the automotive air conditioner.

This automotive air conditioner has a casing 501 in which are accommodated a blower 503, an evaporator 505, an air-mixing door 506, and a heater core 507.

The casing 501 is formed with a defroster outlet d, a vent outlet v, and a foot outlet f.

The defroster outlet d and the vent outlet v are located in an upper part of the casing 501, while the foot outlet f is located in a lower part of the same. Air is blown into the cabin space of the compartment R from the respective outlets d, v, f via ducts (not shown).

On an automotive assembly line, when the automotive air conditioner, the steering member S, and the like are mounted on an automotive vehicle, the automotive air conditioner is mounted first. In doing this, ends of pipes of an evaporator 505 and a heater core 507 are projected via holes of the fire panel into the engine room.

Next, the steering member S is mounted.

Finally, the instrument panel is laid over the steering member S and the automotive air conditioner, and an upper part of the instrument panel is screwed to a cowl, while a lower part of the instrument panel is screwed to the floor panel Fl.

From the viewpoint of safety in collision in recent years, a vehicle came into existence which has a steering member arranged in a location lower than and ahead of that of the steering member S shown in FIG. 28

In this kind of vehicle, the space in which only the automotive vehicle alone has been installed is crossed by the steering member S.

As a result, when an attempt is made to first mount the automotive air conditioner on the vehicle, and then mount the steering member S, the steering member S is interfered with the automotive air conditioner, and hence cannot be mounted. Inversely, when an attempt is made to first mount the steering member S on the vehicle, and then mount the automotive air conditioner, the automotive air conditioner is interfered with the steering S and cannot be mounted.

As described above, a change in the mounting location of the steering member S has brought about a problem that both the air conditioner and the steering member S cannot be installed on the vehicle.

The present invention has been made in view of these circumstances, and an object thereof is to provide an automotive air conditioner and an instrument panel module which can cope with a change in the mounting location of the steering member.

DISCLOSURE OF INVENTION

An automotive air conditioner according to the present invention is characterized by comprising a casing having at least one of air-introducing means for introducing air, blowing means for blowing the air from the air-introducing means, cooling means for cooling the air introduced by the blowing means from the air-introducing means, heating means for heating the air introduced by the blowing means from the air-introducing means, and air-distributing means for distributing the cooled air or the heated air, and a steering member-accommodating portion formed in the casing, for accommodating a steering member extending in a right-left direction of a vehicle, wherein the casing can be divided at least into an instrument panel-side part adjacent to an instrument panel and a fire panel-side part adjacent to a fire panel.

An automotive air conditioner according to the present invention is characterized by comprising a casing having at least one of air-introducing means for introducing air, blowing means for blowing the air from the air-introducing means, cooling means for cooling the air introduced by the blowing means from the air-introducing means, heating means for heating the air introduced by the blowing means from the air-introducing means, and air-distributing means for distributing the cooled air or the heated air, and a steering member interference-avoiding portion formed in the casing, for avoiding interference with a steering member extending in a right-left direction of a vehicle, wherein the casing can be divided at least into an instrument panel-side part adjacent to an instrument panel and a fire panel-side part adjacent to a fire panel.

An automotive air conditioner according to the present invention is characterized by comprising a casing having at least one of air-introducing means for introducing air, blowing means for blowing the air from the air-introducing means, cooling means for cooling the air introduced by the blowing means from the air-introducing means, heating means for heating the air introduced by the blowing means from the air-introducing means, and air-distributing means for distributing the cooled air or the heated air, and a steering member arranging-space portion formed in the casing, for arranging therein a steering member extending in a right-left direction of a vehicle, wherein the casing can be divided at least into an instrument panel-side part adjacent to an instrument panel and a fire panel-side part adjacent to a fire panel.

The automotive air conditioner according to the present invention is characterized in that the steering member-accommodating portion is a hole extending through the casing in the right-left direction of the vehicle or a recess formed in an outer surface of the casing in the right-left direction of the vehicle.

The automotive air conditioner according to the present invention is characterized in that the steering member interference-avoiding portion is a hole extending through the casing in the right-left direction of the vehicle or a recess formed in an outer surface of the casing in the right-left direction of the vehicle.

The automotive air conditioner according to the present invention is characterized in that the steering member-arranging space portion is a hole extending through the casing in the right-left direction of the vehicle or a recess formed in an outer surface of the casing in the right-left direction of the vehicle.

The automotive air conditioner according to the present invention is characterized in that the instrument panel-side part can be removed in one direction.

The automotive air conditioner according to the present invention is characterized in that air conditioner components including the cooling means, the heating means, and the air-distributing means are systematically classified into groups, and that ones of the air conditioner components belonging to a first group are assigned to the instrument panel-side part, and ones of the air conditioner components belonging to a second group are assigned to the fire panel-side part.

The automotive air conditioner according to the present invention is characterized in that the instrument panel-side part can be removed in one direction, that air conditioner components including the cooling means, the heating means, and the air-distributing means are systematically classified into groups, and that ones of the air conditioner components belonging to a first group are assigned to the instrument panel-side part, and ones of the air conditioner components belonging to a second group are assigned to the fire panel-side part.

The automotive air conditioner according to the present invention is characterized in that the fire panel-side part is commonly usable in a plurality of kinds of vehicles, and the instrument panel-side part is usable for only a specific kind of vehicles.

The automotive air conditioner according to the present invention is characterized in that division into the instrument panel-side part and the fire panel-side part is effected using the steering member-accommodating portion as a boundary.

The automotive air conditioner according to the present invention is characterized in that division into the instrument panel-side part and the fire panel-side part is effected using the steering member interference-avoiding portion as a boundary.

The automotive air conditioner according to the present invention is characterized in that division into the instrument panel-side part and the fire panel-side part is effected using the steering member-arranging space portion as a boundary.

The automotive air conditioner according to the present invention is characterized in that the one belonging to the first group is the air-distributing means, that the ones belonging to the second group are the cooling means and the heating means, that the air-distributing means comprises a mode door for opening and closing an air outlet opening of the casing and a drive mechanism for driving the mode door, and that the cooling means and the heating means are both heat exchangers.

The automotive air conditioner according to the present invention is characterized in that the one belonging to the first group is the air-distributing means, that the one belonging to the second group is the heating means, that the air-distributing means comprises a mode door for opening and closing an air outlet opening of the casing and a drive mechanism for driving the mode door, and that the heating means is a heat exchanger.

The automotive air conditioner according to the present invention is characterized in that the ones belonging to the first group are the heating means and the air-distributing means, that the one belonging to the second group is the cooling means, that the heating means is an electric heater, that the air-distributing means comprises a mode door for opening and closing an air outlet opening of the casing and a drive mechanism for opening and closing the mode door, and that the cooling means is a heat exchanger.

The automotive air conditioner according to the present invention is characterized in that the steering member-accommodating portion is located between the blowing means and the cooling means.

The automotive air conditioner according to the present invention is characterized in that the steering member-accommodating portion is located between the cooling means and the heating means.

The automotive air conditioner according to the present invention is characterized in that the steering member-accommodating portion is located downstream of an air passage of the heating means.

The automotive air conditioner according to the present invention is characterized in that the steering member-accommodating portion is located above the heating means in a vertical direction of the vehicle.

The automotive air conditioner according to the present invention is characterized in that the steering member-accommodating portion is located in a mixing space wherein air having passed through the cooling means and air having passed through the heating means are mixed with each other.

The automotive air conditioner according to the present invention is characterized in that the steering member-accommodating portion is located within an intake box forming part of the air-introducing means.

The automotive air conditioner according to the present invention is characterized in that the steering member interference-avoiding portion is located between the blowing means and the cooling means.

The automotive air conditioner according to the present invention is characterized in that the steering member interference-avoiding portion is located between the cooling means and the heating means.

The automotive air conditioner according to the present invention is characterized in that the steering member interference-avoiding portion is located downstream of an air passage of the heating means.

The automotive air conditioner according to the present invention is characterized in that the steering member interference-avoiding portion is located above the heating means in a vertical direction of the vehicle.

The automotive air conditioner according to the present invention is characterized in that the steering member interference-avoiding portion is located in a mixing space wherein air having passed through the cooling means and air having passed through the heating means are mixed with each other.

The automotive air conditioner according to the present invention is characterized in that the steering member interference-avoiding portion is located within an intake box forming part of the air-introducing means.

The automotive air conditioner according to the present invention is characterized in that the steering member-arranging space portion is located between the blowing means and the cooling means.

The automotive air conditioner according to the present invention is characterized in that the steering member-arranging space portion is located between the cooling means and the heating means.

The automotive air conditioner according to the present invention is characterized in that the steering member-arranging space portion is located downstream of an air passage of the heating means.

The automotive air conditioner according to the present invention is characterized in that the steering member-arranging space portion is located above the heating means in a vertical direction of the vehicle.

The automotive air conditioner according to the present invention is characterized in that the steering member-arranging space portion is located in a mixing space wherein air having passed through the cooling means and air having passed through the heating means are mixed with each other.

The automotive air conditioner according to the present invention is characterized in that the steering member-arranging space portion is located within an intake box forming part of the air-introducing means.

An automotive air conditioner according to the present invention is characterized by comprising a casing having at least one of air-introducing means for introducing air, blowing means for blowing the air from the air-introducing means, cooling means for cooling the air introduced by the blowing means from the air-introducing means, heating means for heating the air introduced by the blowing means from the air-introducing means, and air-distributing means for distributing the cooled air or the heated air, and a rigid portion formed integrally with the casing and forming part of a steering member extending in a right-left direction of a vehicle.

The automotive air conditioner according to the present invention is characterized in that the weight of the casing is divided between front and rear portions of the vehicle with the steering member as a center.

The automotive air conditioner according to the present invention is characterized in that the casing can be divided at least into an instrument panel-side part adjacent to an instrument panel and a fire panel-side part adjacent to a fire panel.

The automotive air conditioner according to the present invention is characterized in that the instrument panel-side part can be removed in one direction.

The automotive air conditioner according to the present invention is characterized in that air conditioner components including the cooling means, the heating means, and the air-distributing means are systematically classified into groups, and that ones of the air conditioner components belonging to a first group are assigned to the instrument panel-side part, and ones of the air conditioner components belonging to a second group are assigned to the fire panel-side part.

The automotive air conditioner according to the present invention is characterized in that the fire panel-side part is commonly usable in a plurality of kinds of vehicles, and the instrument panel-side part is usable for only a specific kind of vehicles.

An instrument panel module according to the present invention is characterized in that the automotive air conditioner is integrally provided on the instrument panel.

An automotive air conditioner according to the present invention is characterized in that in an automotive air conditioner having a cooling heat exchanger and a heater arranged within a unit casing sequentially from a front side of a vehicle toward a rear side of the vehicle, the unit casing is formed with an interference avoiding portion for avoiding interference with a steering member extending in a right-left direction of the vehicle, and the unit casing is divided into a front casing part and a rear casing part with the interference avoiding portion as a boundary.

The automotive air conditioner according to the invention is characterized in that the cooling heat exchanger is accommodated within the front casing part, and the heater is accommodated within the rear casing part, the interference avoiding portion forming a hole extending through the unit casing in the right-left direction of the vehicle, the interference avoiding portion being located in an air passage extending from the cooling heat exchanger to the heater at a substantially intermediate location with respect to a vertical direction of the vehicle.

The automotive air conditioner according to the invention is characterized in that an air-mixing door is arranged between the cooling heat exchanger and the heater, the air-mixing door being accommodated within the rear casing part, the front casing part and the rear casing part each permitting division into a right part and a left part with respect to the right-left direction of the vehicle, a pair of the parts forming the rear casing part being fixed in a vicinity of the interference avoiding means in the right-left direction of the vehicle by fixing means.

BRIEF DESCRIPTION OF DRAWINGS

FIG. 5(a) is a view of a dividing surface of a fire panel-side part as viewed from an instrument panel side, and FIG. 5(b) is a view of a dividing surface of an instrument panel-side part as viewed from a fire panel side;

FIGS. 6(a) to (e) are views showing cross-sectional shapes of holes;

FIG. 23(a) is a side view of an instrument panel-side part, and FIG. 23(b) is a view of the instrument panel-side part as viewed from a fire panel side;

BEST MODE FOR CARRYING OUT THE INVENTION

The invention will now be described in detail with reference to drawings showing preferred embodiments thereof.

Figure 1:
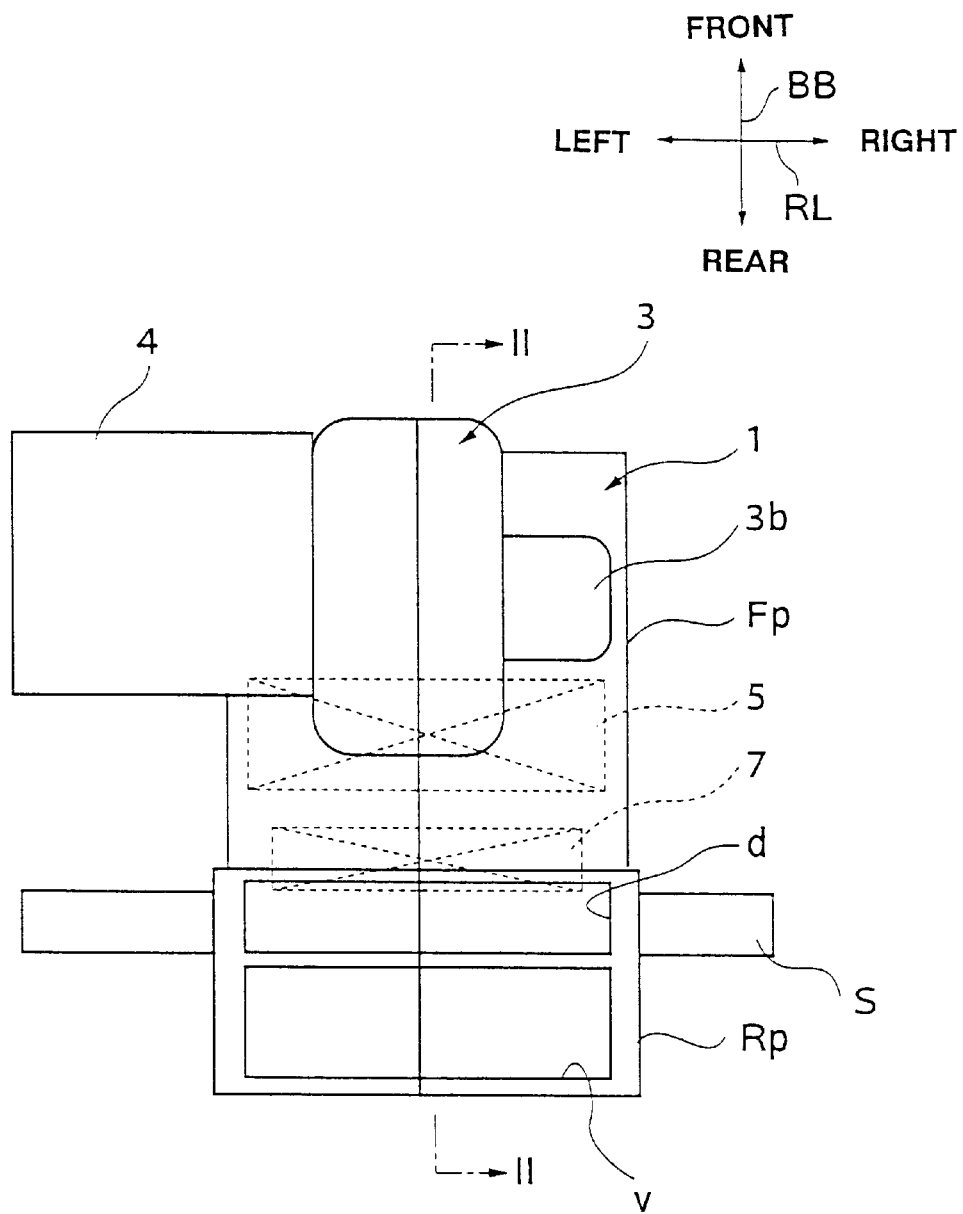
FIG. 1 is a plan view of an automotive air conditioner according to a first embodiment of the invention.
Figure 2:
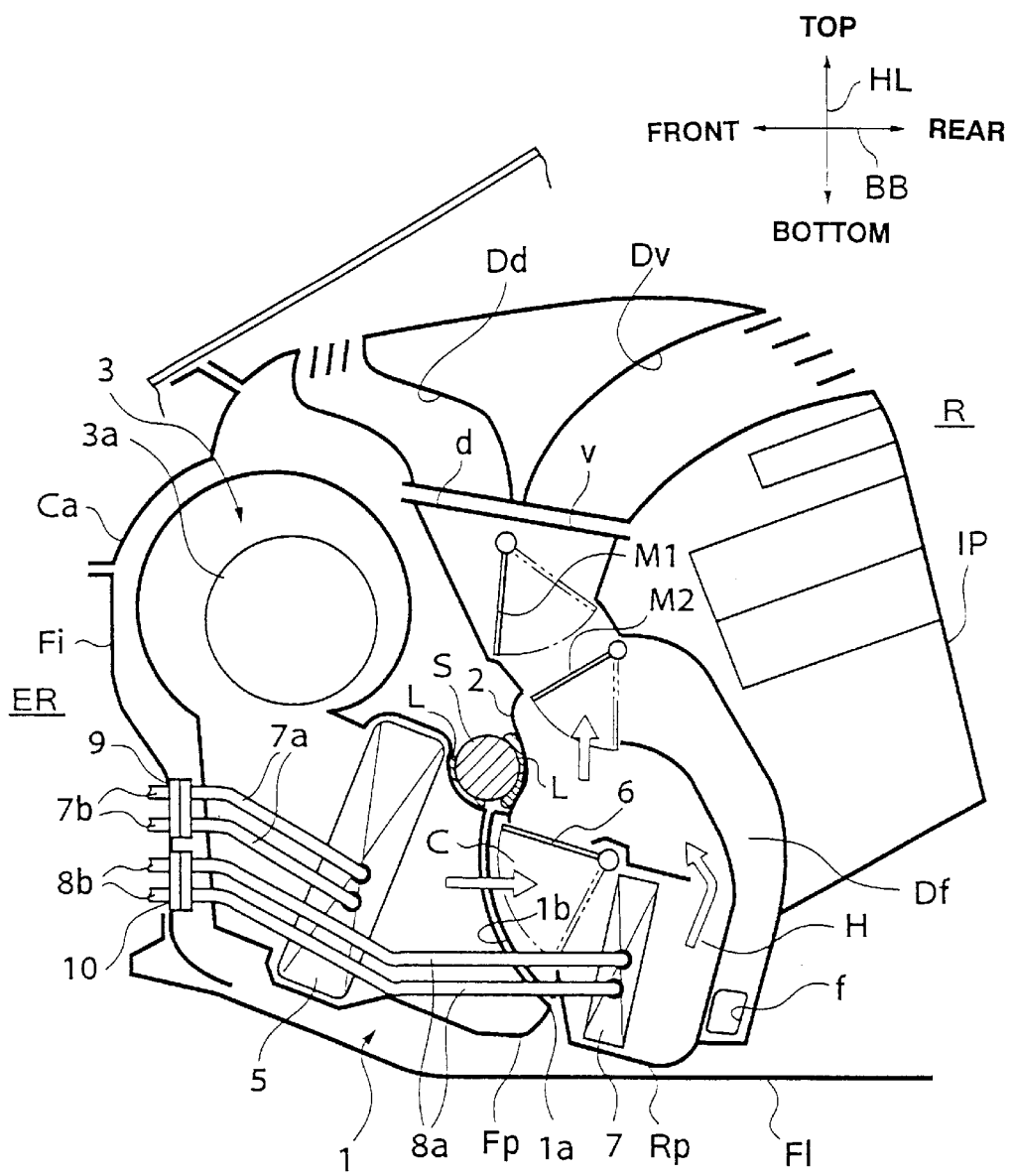
FIG. 2 is a cross-sectional view taken on line II—II of FIG. 1.

FIG. 1 is a plan view of an automotive air conditioner according a first embodiment of the invention, and FIG. 2 is a cross-sectional view taken on line II—II of FIG. 1.

This automotive air conditioner is received in a space defined by an instrument panel IP, a cowl Ca, a fire panel Fi, and a floor panel Fl.

The fire panel Fi divides between an engine room ER and a compartment R, while the floor panel Fl forms the floor of the compartment R. This automotive air conditioner and the instrument panel IP are located within the compartment R.

Figure 28:
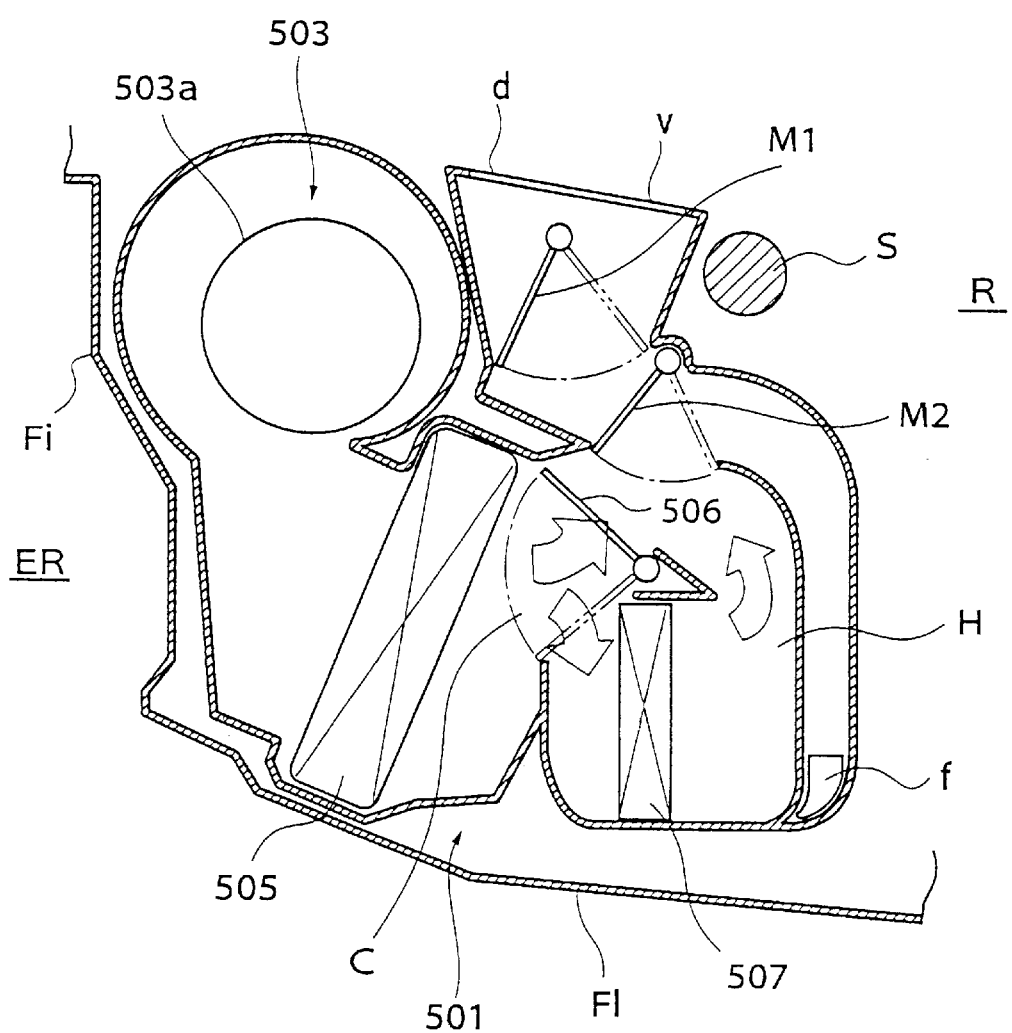
FIG. 28 is a longitudinal cross-sectional view of a conventional automotive air conditioner.

A steering member S is arranged at a location lower than and ahead of that of the conventional steering member S (see FIG. 28).

Figure 4:
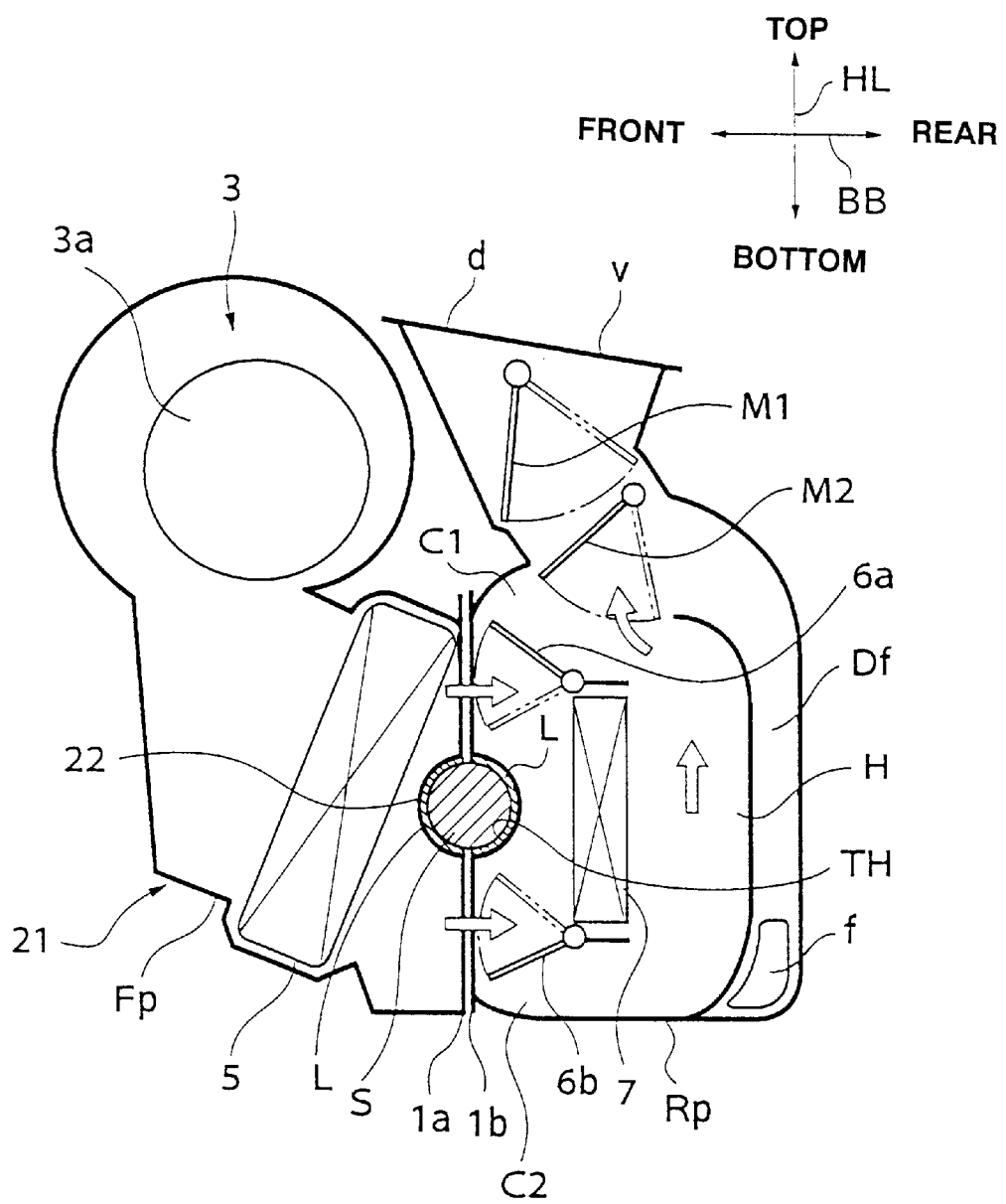
FIG. 4 is a longitudinal cross-sectional view of an automotive air conditioner according to a third embodiment of the invention.

This automotive air conditioner has a casing 1 formed with a recess (steering member-accommodating portion) 2 for receiving the steering member S extending in a right-left direction RL of the vehicle. The steering member-accommodating portion may be formed by a hole TH as shown in FIG. 4 etc., instead of the recess 2. The recess 2 or the hole TH provides a space portion for arranging the steering member S therein (steering member-arranging space portion), or a relief portion for avoiding the interference with the steering member S (steering member interference-avoiding portion).

The casing 1 is divided into two parts, a fire panel-side part Fp and an instrument panel-side part Rp, with the recess 2 as a boundary. The recess 2 of the casing 1 has an anti-vibration lining L attached thereto for absorbing vibrations transmitted to the casing via the steering member when the vehicle is traveling.

The dividing surface 1a of the fire panel-side part Fp and the dividing surface 1b of the instrument panel-side part are coupled to each other under pressure by means of fixing means (not shown), such as screws, via a sealing member, such as urethane resin, thereby forming a single unit of the casing 1. This structure is also common to other embodiments (except a tenth embodiment, an eleventh embodiment, and a twelfth embodiment) including a second embodiment, described hereinafter. In FIG. 2, for convenience of explanation, the dividing surfaces 1a and 1b are shown separate from each other.

The fire panel-side part Fp has a blower (blowing means) 3 and an evaporator (cooling means) 5. An intake box 4 forming part of air-introducing means is connected to the he fire panel-side part Fp. The intake box 4 is formed with an internal air-introducing port and an external air-introducing port, neither of which is shown, and an internal/external air-switching door, not shown, is provided within the intake box 4. The air-introducing means comprises the intake box 4 and the internal/external air-switching door.

The blower 3 has a fan 3a for sending air introduced into the intake box to the evaporator 5. Part of a motor 3b for rotating the fan 3a protrudes out of the casing 1.

The evaporator 5 is a heat exchanger for cooling air from the fan 3a.

The instrument panel-side part Rp has an air-mixing door 6, a heater core (heating means) 7, and mode doors M1, M2 (air-distributing means).

The air-mixing door 6 adjusts the proportion between air passing through the heater core 7 and air not passing through the same.

The heater core 7 is a heat exchanger for heating air from the evaporator 5.

The instrument panel-side part Rp is provided with a defroster outlet d, a vent outlet v, and a foot outlet f.

The defroster outlet d and the vent outlet v are located in an upper part of the instrument panel-side part Rp, and the foot outlet f is located in a lower part of the instrument panel-side part Rp, whereby the air is distributed into the cabin space of the compartment R from the respective outlets d, v, f via ducts Dd, Dv, and a duct portion Df. The outlets d, v, f are opened and closed by the mode doors M1, M2.

It should be noted that the fire panel-side part Fp and the instrument panel-side part Rp can be each divided in the right-left direction RL of the vehicle, and the left and right casing component parts constituting the fire panel-side part Fp and the instrument panel-side part Rp are fixed in the right-left direction by fixing means (not shown), such as tapping screws. This feature of the construction commonly applies to the other embodiments of the invention including a second embodiment.

Then, instrument panel-side part Rp is joined to the fire panel-side part Fp.

Next, a procedure of assembling the automotive air conditioner, the steering member S and so forth with a vehicle on a vehicle assembly line will be described.

First, the fire panel-side part Fp and the instrument panel-side part Rp of the automotive air conditioner are mounted on the vehicle. At this time, the fire panel-side part Fp is fixed to the fire panel Fi by bolts, and a connector 9 of a refrigerant pipe 7a of the evaporator 5 is fixed to the fire panel Fi. The refrigerant pipe 7a is connected to a refrigerant pipe 7b of the engine room ER.

Next, the steering member S is mounted on the vehicle. At this time, the steering member S is brought into contact with the anti-vibration lining L of the fire panel-side part Fp. At this time, a connector 10 of a hot water pipe 8a of the heater core 7 is fixed to the fire panel Fi. The hot water pipe 8a is connected to a hot water pipe 8b of the engine room ER.

By joining of the instrument panel-side part Rp and the fire panel-side part Fp, one recess 2 is formed, and the steering member S is received in this recess 2. The steering member S at this time is held by the anti-vibration lining L attached to the fire panel-side part Fp and the anti-vibration lining L attached to the instrument panel-side part Rp.

Finally, the instrument panel IP is laid over the automotive air conditioner, and the upper part of the instrument panel IP is screwed to the cowl Ca and the instrument panel-side part Rp, while the lower part of the instrument panel IP is screwed to the floor panel Fl.

Next, the operation of the automotive air conditioner described above will be described.

When the air-mixing door 6 and the mode doors M1, M2 are in respective positions indicated by solid lines, as shown in FIG. 2, a cold air bypass passage C is blocked, and all the air having passed through the evaporator 5 flows toward the heater core 7. The air is heated when passing through the heater core 7, and flows through the duct portion Df to the foot outlet f, from which it is blown into the cabin space of the compartment R.

When the air-mixing door 6 and the mode door M2 are in respective positions indicated by phantom lines in FIG. 2, and the mode door M1 is in a position indicated by solid lines in the same, the air having passed through the evaporator 5 does not pass through the heater core 7 but pass through the cold air bypass passage C to the vent outlet V, from which the air flows through the duct Dv and is blown into the cabin space of the compartment R.

According to this first embodiment, since the casing 1 is formed with the recess 2 as the steering member-accommodating portion, even if the location of the steering member S is shifted to a position in which the steering member S crosses the space for installation of the automotive air conditioner, it is possible to mount the steering member S and the automotive air conditioner on the vehicle (effects (1)).

Further, since the casing 1 is configured such that it can be divided into the fire panel-side part Fp and the instrument panel-side part Rp, the whole automotive air conditioner is not required to be removed from the vehicle when the maintenance is carried out, whereby the workability is improved, and the working hours and manufacturing costs can be reduced (effects (2)). For instance, in this embodiment, when maintenance is carried out for the heater core 7, it is only required to detach the instrument panel-side part Rp from the vehicle without removing the fire panel-side part Fp from the same. Therefore, it is not necessary to separate the refrigerant pipe 7a of the engine room R from the refrigerant pipe 7b of the engine room ER, nor to remove electric chords, not shown, of the floor 3, the intake box 4, etc., which reduces working hours, and manufacturing costs. Further, it is no longer necessary to drain the refrigerant, which meets the requirement of saving of resources.

Further, the weight of the casing 1 is distributed in the front-rear direction BB of the vehicle with the steering member S as the center. Therefore, when the assembled unit of the instrument panel-side part Rp, the steering member S, and the fire panel-side part Fp is mounted on the vehicle, the inclination of the casing 1 suspended on the steering member S is smaller than the conventional one, so that the installation of the automotive air conditioner on the vehicle is facilitated, and the structure for connecting the casing 1 to the steering member S can be simplified since brackets and the like can be dispensed with (effects (3)).

Further, since the instrument panel-side part Rp can be pulled out in one direction, it is easy to mount and remove the instrument panel-side part Rp, and no large space is required for the operations of mounting and removing the same. Further, the fire panel-side part Fp and the instrument panel-side part Rp are hard to be misaligned at the joined portion thereof, which improves the sealing property (effects (4)).

Further, the fire panel-side part Fp and the instrument panel-side part Rp are configured such that the fire panel-side part Fp is commonly usable in a plurality of kinds of vehicles, and only the instrument panel-side part Rp is dedicatedly usable in a specific kind of vehicles, so that the number of steps of designing the casing can be reduced and the cost of molds or dies of the casing can be reduced (effects (5)).

Further, since the casing is divided into the fire panel-side part Fp and the instrumental panel side-part Rp with the recess 2 as the boundary, the brackets and the like can be dispensed with, and the coupling of the casing 1 and the steering member S becomes easy (effects (6)).

Figure 3:
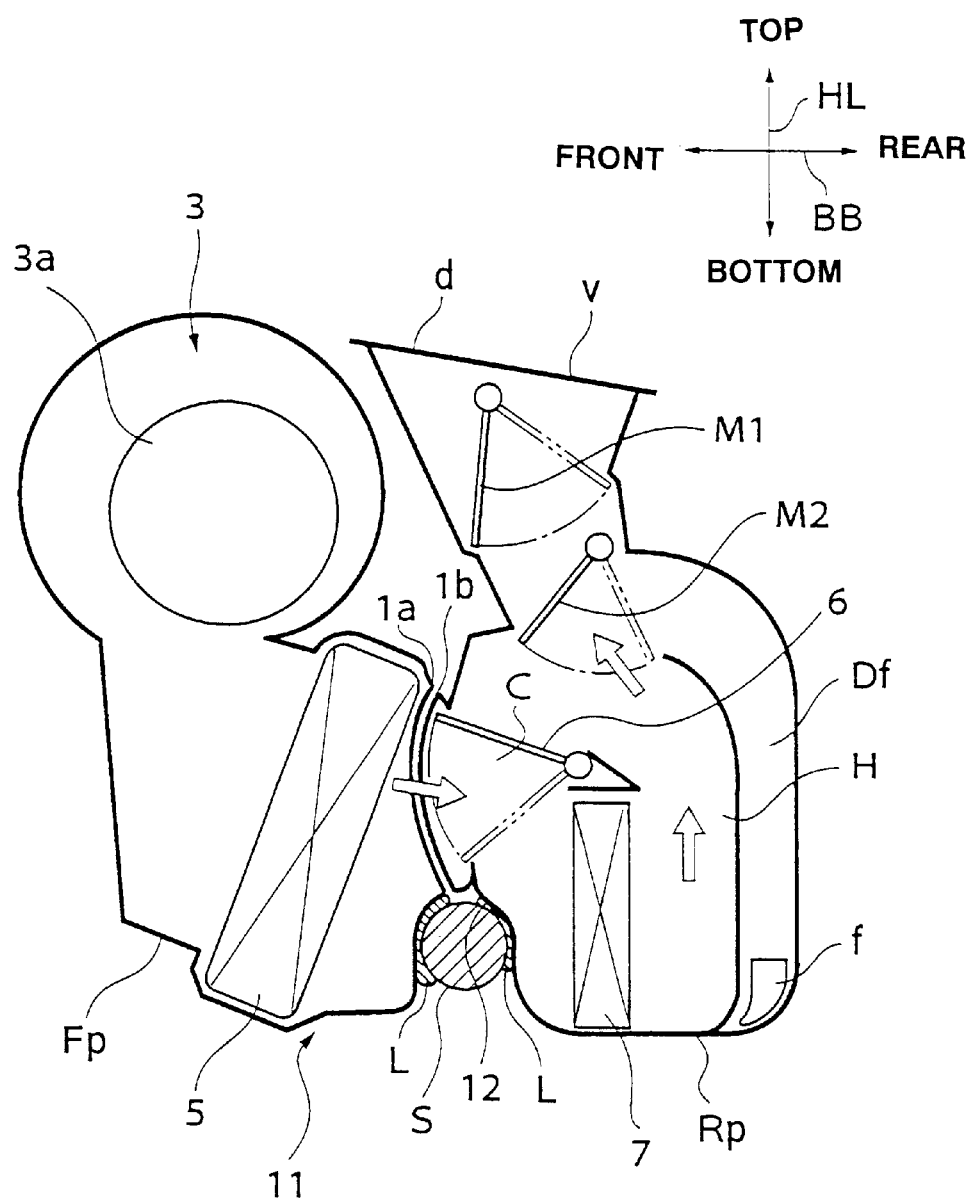
FIG. 3 is a longitudinal cross-sectional view of an automotive air conditioner according to a second embodiment of the invention.

FIG. 3 is a longitudinal cross-sectional view of an automotive air conditioner according to the second embodiment of the invention. In FIG. 3, illustration of the instrument panel IP, the cowl Ca, the fire panel Fi, and the floor panel Fl is omitted. The component parts common to those in the first embodiment are designated by identical reference numerals and description thereof is omitted.

In the second embodiment, the steering member S is positioned at a location lower than the steering member S shown in FIG. 2, and accordingly, a recess (steering member-accommodating portion) 12 is formed in a lower portion of a casing 11 with respect to the vertical direction HL of the vehicle.

According to the second embodiment, the same effects as provided by the first embodiment described above can be obtained.

FIG. 4 is a longitudinal cross-sectional view of an automotive air conditioner according to a third embodiment of the invention. FIG. 5(a) is a view of a dividing surface of a fire panel-side part as viewed from an instrument panel side, and FIG. 5(b) is a view of a dividing surface of an instrument panel-side part as viewed from a fire panel side. FIGS. 6(a) to (e) are views showing cross-sectional shapes of holes. In FIG. 4, illustration of the instrument panel IP, the cowl Ca, the fire panel Fi, and the floor panel Fl is omitted. The component parts common to those in the first embodiment are designated by identical reference numerals and description thereof is omitted.

A casing 21 of the automotive air conditioner according to this embodiment is divided into the two parts of the fire panel-side part Fp and the instrument panel-side part Rp with a hole (steering member-accommodating portion) TH as a boundary. The dividing surface 1a of the fire panel-side part Fp and the dividing surface 1b of the instrument panel-side part Rp are formed with respective semi-cylindrical hollow portions, and one hollow cylindrical portion 22 is formed when the two dividing surfaces 1a, 1b are joined to each other. The hollow cylindrical portion 22 forms the hole TH extending through the casing 21 in the right-left direction RL of the vehicle. The hollow cylindrical portion 22 extends in a cold air bypass passage C at a substantially intermediate location with respect to the vertical direction HL of the vehicle, so that branch passages C1, C2 are formed above and below the hollow cylindrical portion 22.

It should be noted that there are other shapes of the hole TH as shown in FIGS. 6(b) to 6(e), in addition to that shown in FIG. 6(a). The shapes shown in FIGS. 6(a) to 6(b) are circular, substantially elliptical, substantially oval, substantially droplet-shaped, and substantially wing-shaped, respectively.

Further, the fire panel-side part Fp and the instrument panel-side part Rp can be each divided in the right-left direction RL of the vehicle, and these parts Fp and Rp are formed by right and left casing components 20a, 20b and right and left casing components 23a, 23b, respectively.

The outer peripheral surface of the hollow cylindrical portion 22 of the instrument panel-side part Rp is formed with a projection 25 having a through hole formed therethrough. A tapping screw (fixing means) 26 inserted into the through hole connects the right and left casing components 23a, 23b in the right-left direction RL of the vehicle.

The fire panel-side part Fp accommodates the fan 3a and the evaporator 5.

The instrument panel-side part Rp accommodates the air-mixing doors 6a, 6b and the heater core 7.

The air-mixing doors 6a, 6b are for adjusting the proportion between air passing through the heater core 7 and air not passing through the same. The air-mixing door 6a is located above the hollow cylindrical portion 22, and the air-mixing door 6b is located below the hollow cylindrical portion 22. These doors are opened and closed in respective predetermined timings.

The instrument panel-side part Rp is provided with the defroster outlet d, the vent outlet v, and the foot outlet f.

The defroster outlet d and the vent outlet v are located in the upper part of the instrument panel-side part Rp, and the foot outlet f is located in the lower part of the instrument panel-side part Rp. The outlets d, e, f are opened and closed by the mode doors M1, M2.

The instrument panel-side part Rp has a sheet surface 24 integrally formed therewith, for the air-mixing doors 6a, 6b.

When the air-mixing doors 6a, 6b and the mode doors M1, M2 are in respective positions indicated by solid lines, as shown in FIG. 4, the branch passages C1, C2 are blocked, and all the air having passed through the evaporator 5 flows through the heater core 7. The air is heated when passing through the heater core 7, and flows to the foot outlet f. By varying the degree of opening of the air-mixing door 6b, for instance, the flow rate of air passing through the heater core 7 can be adjusted to adjust the temperature of the air blown out from the foot outlet f.

When the air-mixing doors 6a, 6b and the mode doors M1, M2 are in respective positions indicated by phantom lines in FIG. 4, and the air having passed through the evaporator 5 does not pass through the heater core 7 but pass through the branch passages C1, C2 to the vent outlet V. By varying the degree of opening of the air-mixing door 6b, for instance, the flow rate of air passing through the heater core 7 can be adjusted to adjust the temperature of the air blown out from the vent outlet f.

According to the third embodiment, the same effects as provided by the first embodiment described above can be obtained.

The air cooled by the evaporator 5 is divided by the hollow cylindrical portion 22 into upper and lower streams, and the cold air bypass passage leading from the evaporator 5 to the heater core 7 can secure a large cross-sectional area, so that the resistance to the air flow can be decreased to increase the quantity of air and reduce the noise.

Further, the tapping screw 26 brings the right and left casing components 23a, 23b into secure and intimate contact with each other in the vicinity of the hollow cylindrical portion 22, so that it is possible to prevent leakage of air from the joint between the right and left casing components 23a, 23b.

Further, since the two air-mixing doors 6a, 6b are used, it is possible to easily carry out temperature adjustment by changing the opening and closing timing of the air-mixing doors 6a, 6b without providing a fixing guide member.

Further, due to the use of the two air-mixing doors, the dimension or size of each of the air-mixing doors 6a, 6b can be made smaller than that of the air-mixing door 6 of the first embodiment. This makes it possible to make the dimension of the casing 21 in the front-rear direction BB of the casing 21 smaller than that in the first embodiment.

Moreover, by forming the cross-section of the hole TH into one of shapes shown in FIGS. 6(b) to 6(e), the flow of air through the casing 21 is made smoother than that provided when it has the shape shown in FIG. 6(a).

Furthermore, a wire harness W can be assembled with the hole TH formed by the hollow cylindrical portion 22 together with the steering member S. This contributes to efficient use of space.

Figure 7:
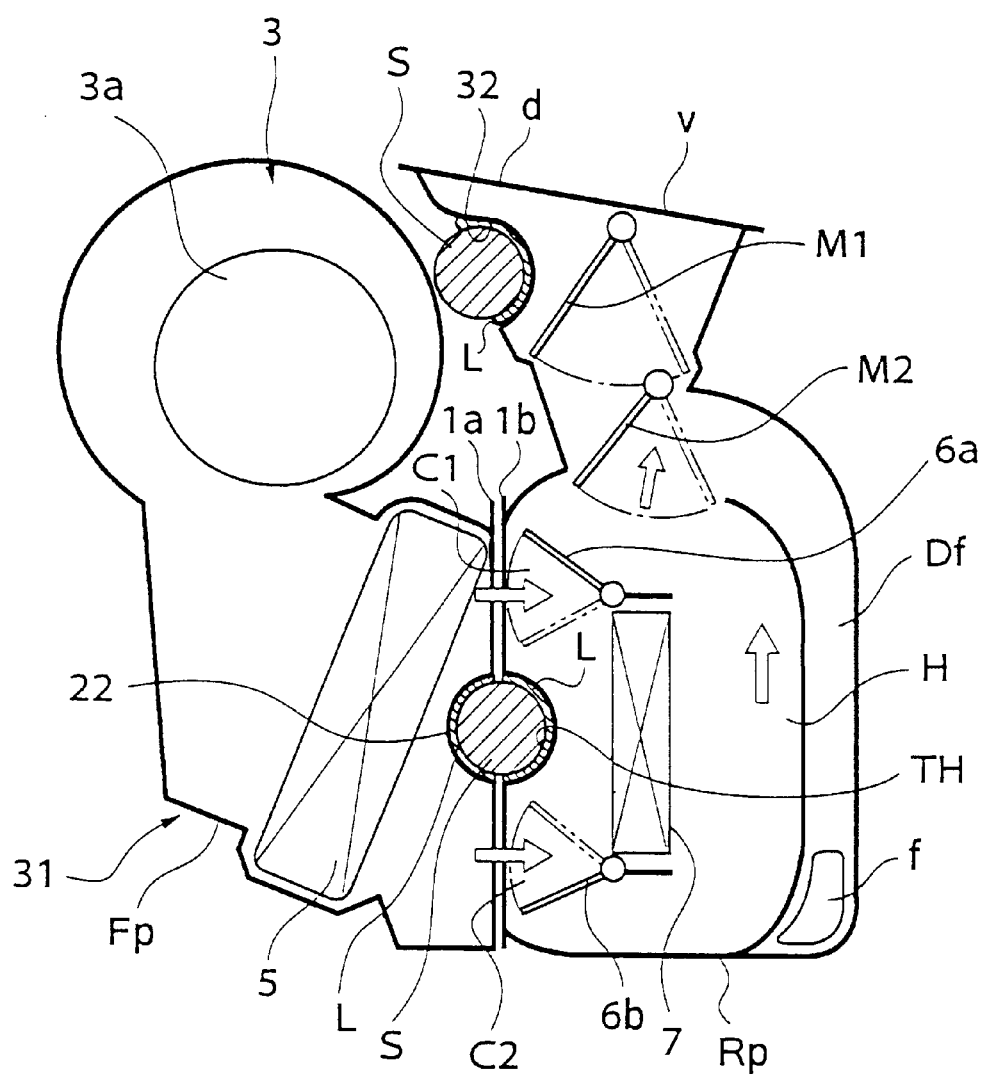
FIG. 7 is a longitudinal cross-sectional view of an automotive air conditioner according to a fourth embodiment of the invention.

FIG. 7 is a longitudinal cross-sectional view of an automotive air conditioner according to a fourth embodiment of the invention. In FIG. 7, illustration of the instrument panel IP, the cowl Ca, the fire panel Fi, and the floor panel Fl is omitted. The component parts common to those in the first and third embodiments are designated by identical reference numerals and description thereof is omitted.

In the third embodiment described above, the steering member S is single, but in the fourth embodiment, there are two steering members S. The lower one of the two steering members S is the same that used in the third embodiment, while the upper one of them is received in a recess (steering member-accommodating portion) 32 formed at a location upstream of the defroster outlet d. The recess 32 is formed in an upper portion of the instrument panel side-part Rp.

According to the fourth embodiment, the same advantageous effects as provided by the third embodiment can be obtained.

Figure 8:
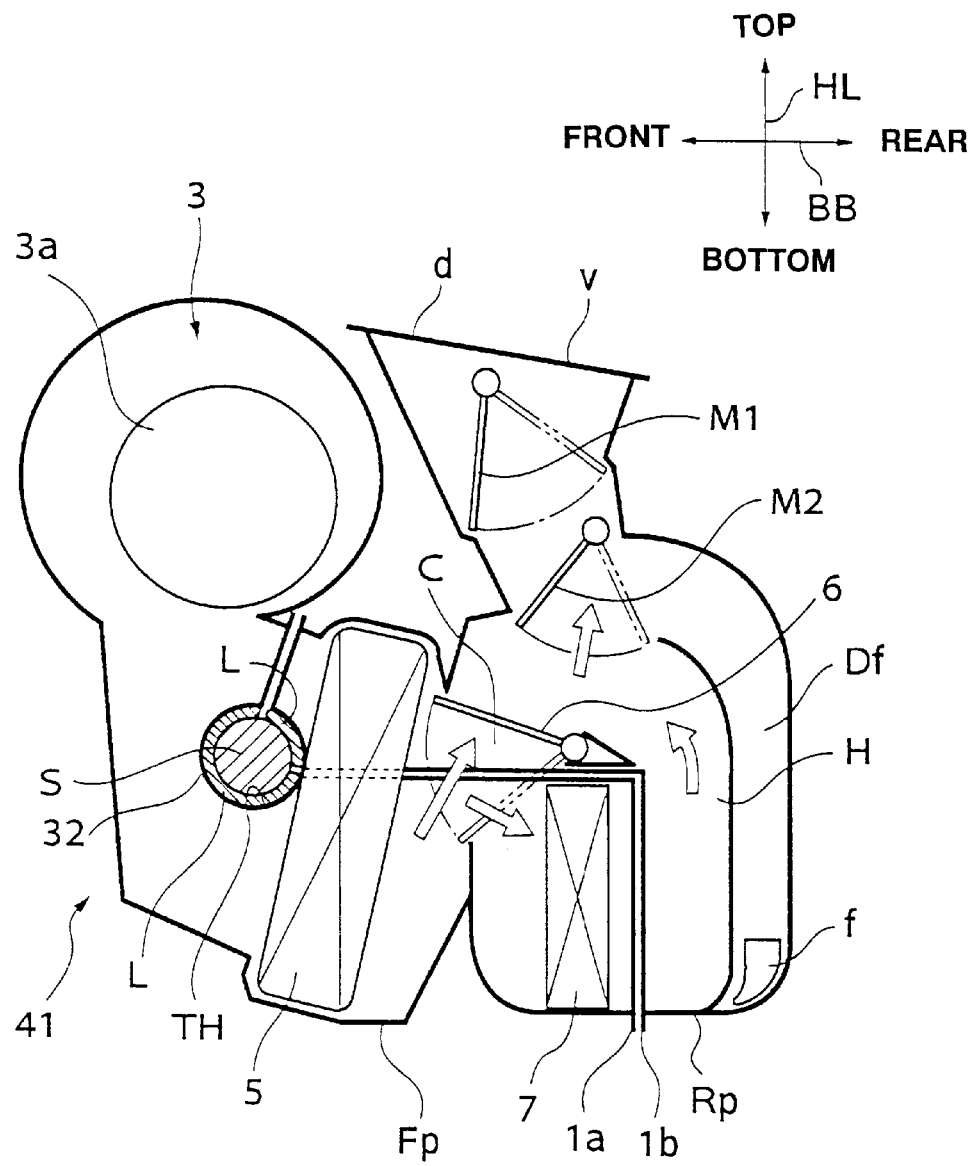
FIG. 8 is a longitudinal cross-sectional view of an automotive air conditioner according to a fifth embodiment of the invention.

FIG. 8 is a longitudinal cross-sectional view of an automotive air conditioner according to a fifth embodiment of the invention. In FIG. 8, illustration of the instrument panel IP, the cowl Ca, the fire panel Fi, and the floor panel Fl is omitted. The component parts common to those in the first embodiment are designated by identical reference numerals and description thereof is omitted.

In the fifth embodiment, the hole (steering member-accommodating portion) TH formed by a hollow cylindrical portion 32 is located between the evaporator 5 and the fan 3a of the blower 3. This enables a casing 41 to be divided into the fire panel side-part Fp and the instrument panel-side part Rp in the front-rear direction BB of the vehicle with the hole TH accommodating the steering member S as a boundary.

In this fifth embodiment, air conditioner components, such as the evaporator 5, the air-mixing door 6, the heater core 7, and the mode doors M1, M2, are classified from the viewpoint of maintainability (systematically classified) into groups, whereby the evaporator 5 and the heater core 7 belonging to piping-related air conditioner components (first group) are assigned to the fire panel-side part Fp, while the air-mixing door 6, and the mode doors M1, M2 belonging to mechanism-related air conditioner components (second group) are assigned to the instrument panel-side part Rp.

According to the fifth embodiment, in addition to the effects provided by the first embodiment, it is possible to obtain the following effects:

The air conditioner components including the evaporator 5, the heater core 7, and the mode doors M1, M2, are classified from the viewpoint of maintainability (systematically classified) into the piping-related group and the mechanism-related group, and air conditioner components belonging to the piping-related group are assigned to the fire panel-side part Fp, while air conditioner components belonging to the mechanism-related group are assigned to the instrument panel-side part Rp. This makes it unnecessary to remove the whole automotive air conditioner from the vehicle when the maintenance is carried out, whereby the operability is improved, and the working hours and manufacturing costs can be reduced (effects (7)). In the fifth embodiment, the air-mixing door 6 and the mode doors M1, M2 are assigned to the instrument panel-side part Rp, and the evaporator 5 and the heater core 7 are assigned to the fire panel-side part Fp. This makes it only necessary, when the maintenance of the air-mixing door 6 and the mode doors M1, M2 is carried out, that only the instrument panel-side part Rp is removed, leaving the fire panel-side part Fp on the vehicle. Therefore, it is not necessary to separate the refrigerant pipe 7a of the compartment R and the refrigerant pip 7b of the engine room ER from each other, separate a hot water pipe 8a of the compartment R and a hot water pipe 8b of the compartment ER from each other, or remove electric chords (not shown) of the blower 3. Therefore, the working hours and manufacturing costs are reduced. Further, it is unnecessary to drain the refrigerant gas and the engine coolant, which meets the requirement of saving of resources.

Although in the fifth embodiment, the air conditioner components are classified from the viewpoint of maintainability (systematically classified) into groups, this is not limitative, but they may be classified from the viewpoint of ease of operation of mounting them on a vehicle, in another embodiment of the invention.

Further, although in the fifth and other embodiments described above, a heat exchanger (heater core 7) is used as heating means, this is not limitative, but an electric heater, not shown, may be employed as the heating means. When the electric heater is employed in place of the heat exchanger, in the first, second, third, fourth, seventh, and eighth embodiments, the air conditioner components belonging to the piping-related group are assigned to the fire panel-side part Fp, and those belonging to other than the piping-related group are assigned to the instrument panel-side part Rp, so that this manner of assignment results in the classification into groups from the viewpoint of the maintainability (systematic classification).

Figure 9:
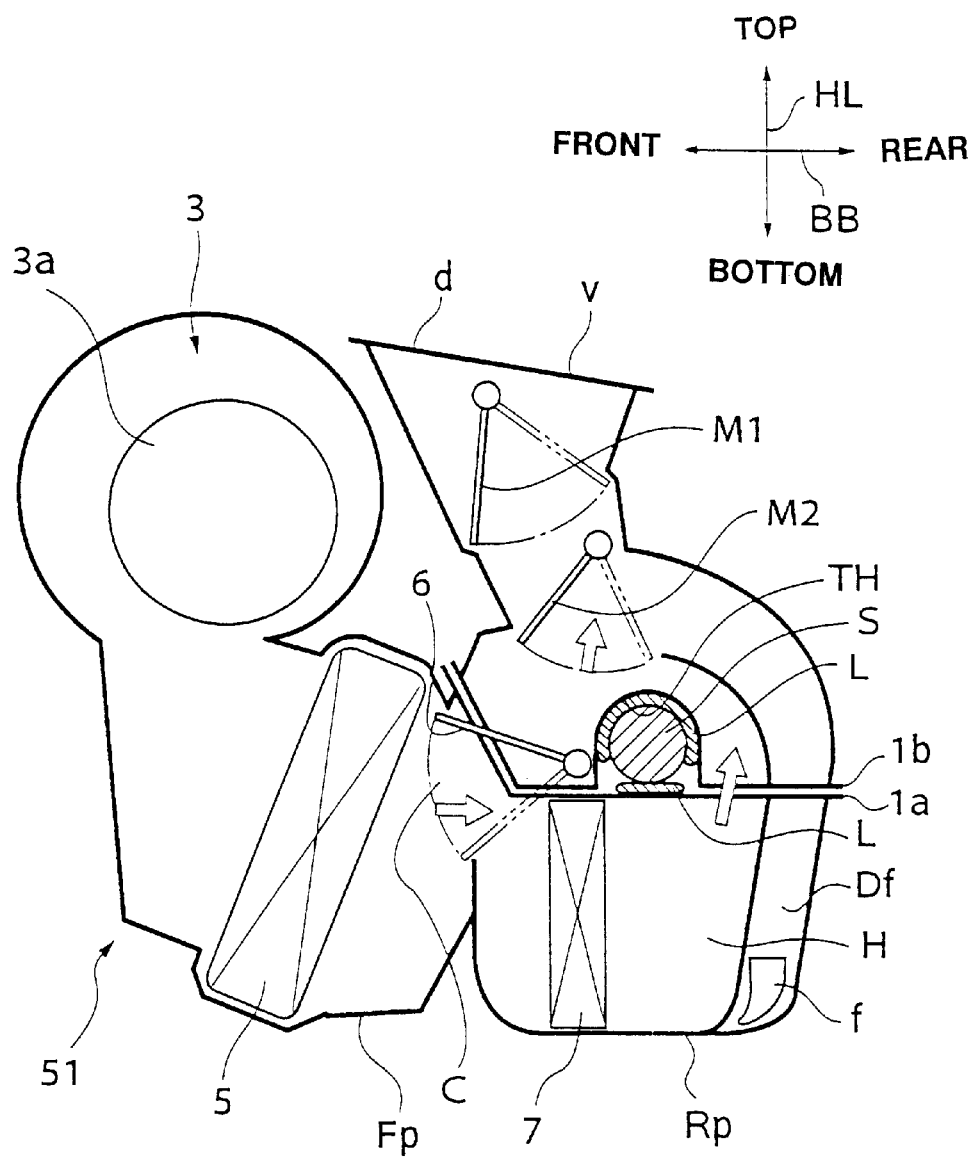
FIG. 9 is a longitudinal cross-sectional view of an automotive air conditioner according to a sixth embodiment of the invention.

FIG. 9 is a longitudinal cross-sectional view of an automotive air conditioner according to a sixth embodiment of the invention. In FIG. 9, illustration of the instrument panel IP, the cowl Ca, the fire panel Fi, and the floor panel Fl is omitted. The component parts common to those in the first embodiment are designated by identical reference numerals and description thereof is omitted.

In the sixth embodiment, a hole (steering member-accommodating portion) TH formed by a hollow cylindrical portion 42 is located above the heater core 7 or within the air-mixing space. A casing 51 is configured such that it can be divided into a fire panel-side part Fp and an instrument panel-side part Rp with the hole TH accommodating the steering member S as a boundary.

This sixth embodiment is the same as the fifth embodiment except for the location of the hole TH and the manner of division.

According to the sixth embodiment, the same advantageous effects as provided by the fifth embodiment can be obtained.

Figure 10:
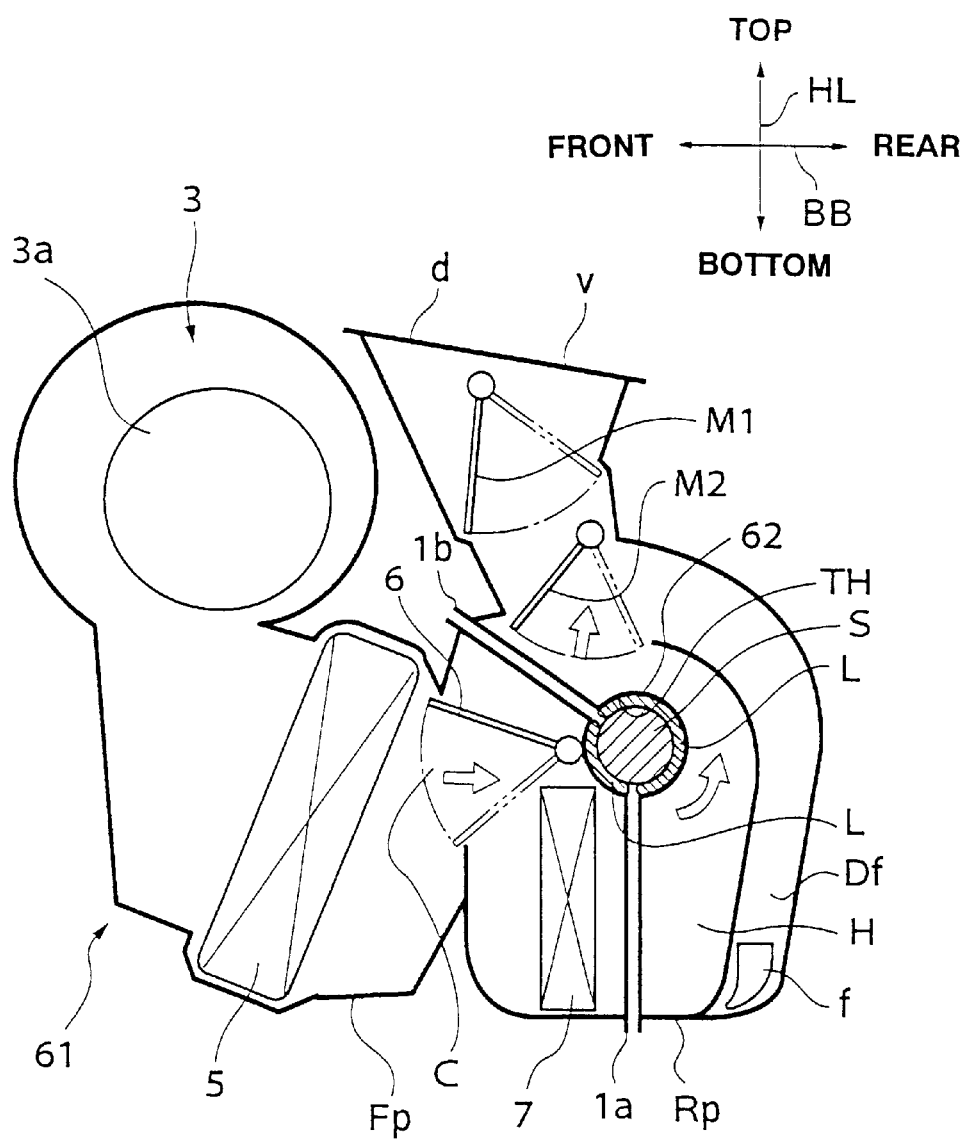
FIG. 10 is a longitudinal cross-sectional view of an automotive air conditioner according to a seventh embodiment of the invention.

FIG. 10 is a longitudinal cross-sectional view of an automotive air conditioner according to a seventh embodiment of the invention. In FIG. 10, illustration of the instrument panel IP, the cowl Ca, the fire panel Fi, and the floor panel Fl is omitted. The component parts common to those in the first embodiment are designated by identical reference numerals and description thereof is omitted.

In the seventh embodiment, a hole (steering member-accommodating portion) TH formed by a hollow cylindrical portion 52 is located above the heater core 7 or within the air-mixing space. A casing 61 is configured such that it can be divided in the front-rear direction BB of the vehicle into a fire panel-side part Fp and an instrument panel-side part Rp with the hole TH accommodating the steering member S as a boundary.

This seventh embodiment is the same as the sixth embodiment except for the manner of division.

According to the seventh embodiment, the same advantageous effects as provided by the first embodiment can be obtained.

Figure 11:
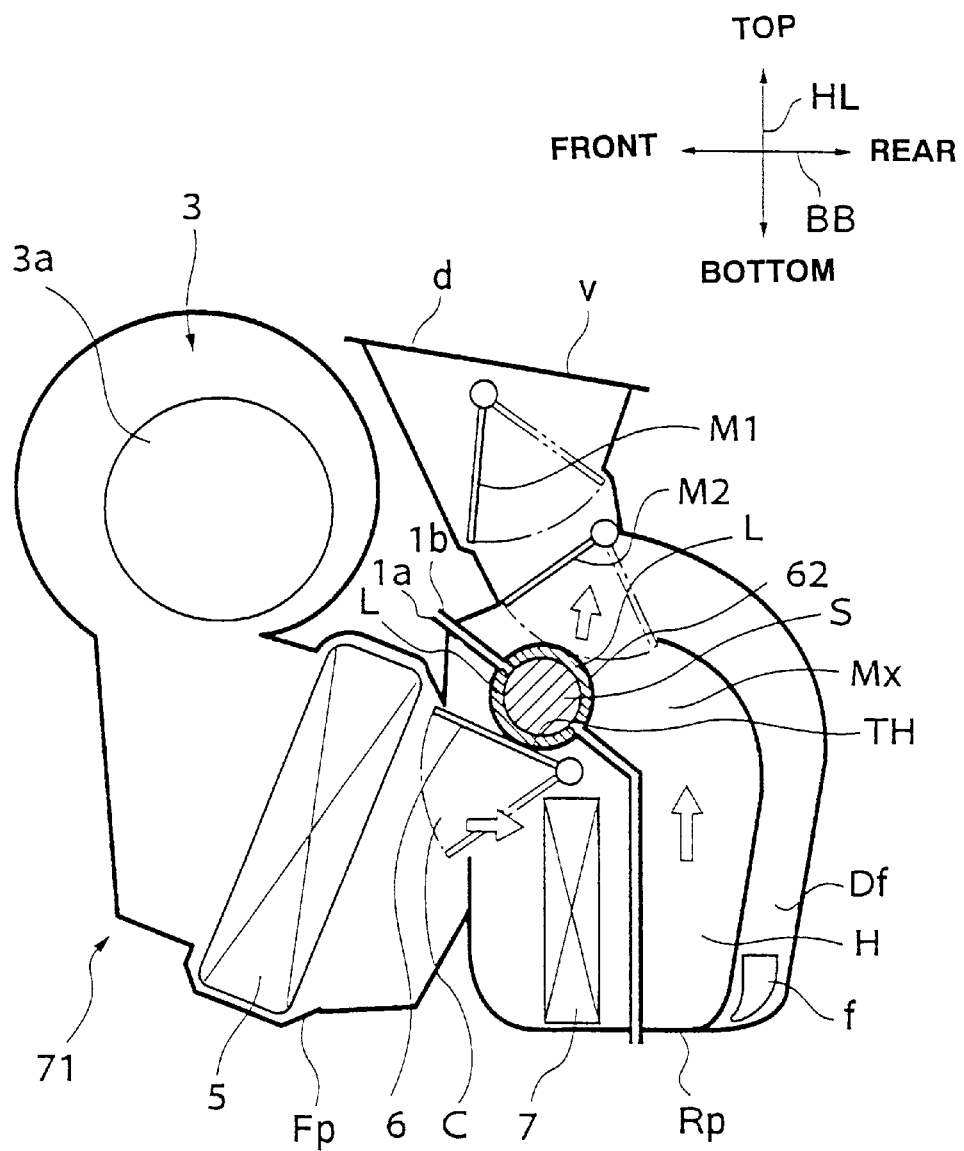
FIG. 11 is a longitudinal cross-sectional view of an automotive air conditioner according to an eighth embodiment of the invention.

FIG. 11 is a longitudinal cross-sectional view of an automotive air conditioner according to an eighth embodiment of the invention. In FIG. 11, illustration of the instrument panel IP, the cowl Ca, the fire panel Fi, and the floor panel Fl is omitted. The component parts common to those in the first embodiment are designated by identical reference numerals and description thereof is omitted.

In the eighth embodiment, a hole (steering member-accommodating portion) TH formed by a hollow cylindrical portion 62 is located within an air-mixing space MX where air from a cold air bypass passage C meet with air from a hot air bypass passage H. A casing 71 is configured such that it can be divided in the front-rear direction BB of the vehicle into a fire panel-side part Fp and an instrument panel-side part Rp with the hole TH accommodating the steering member S as a boundary.

The eighth embodiment is the same as the fifth embodiment except for the location of the hole TH, the manner of division, and the location of the air-mixing door 6.

According to the eighth embodiment, the same advantageous effects as provided by the first embodiment can be obtained.

Figure 12:
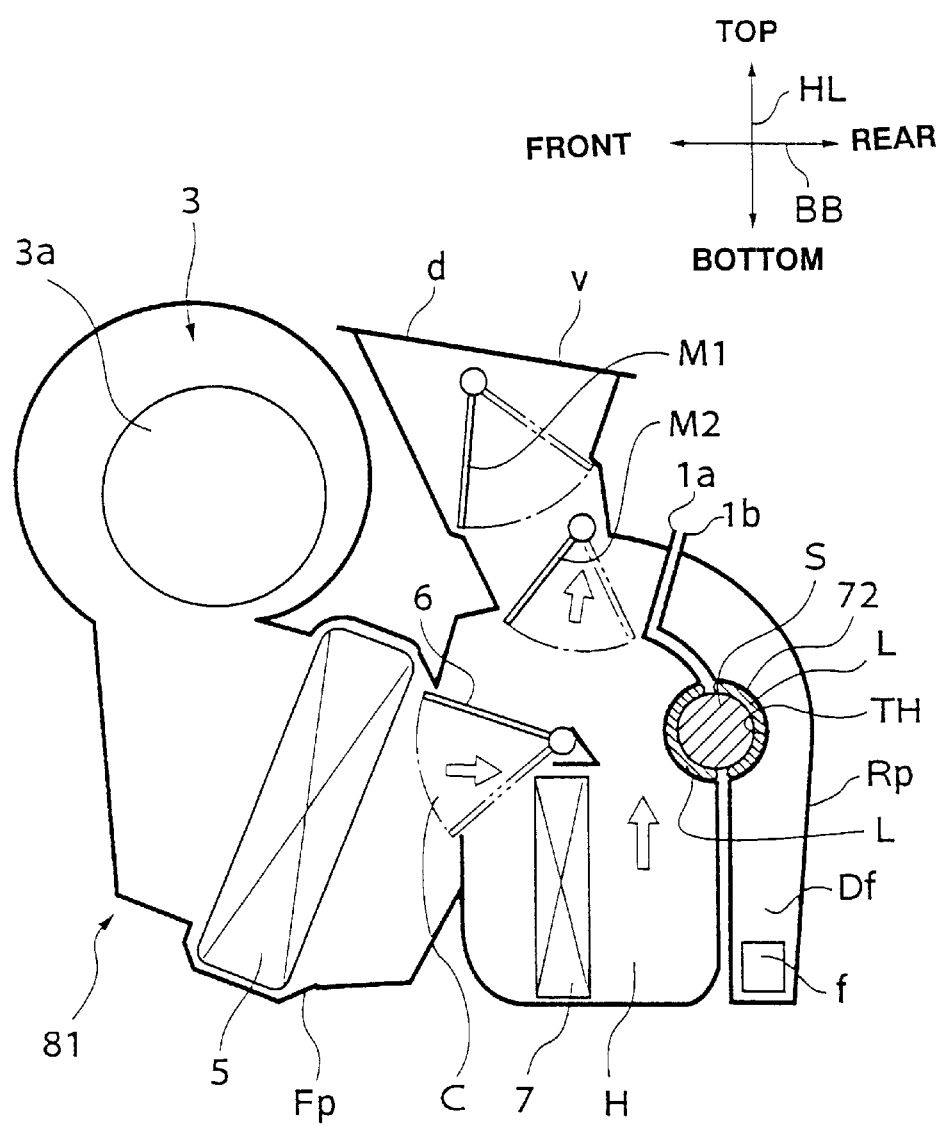
FIG. 12 is a longitudinal cross-sectional view of an automotive air conditioner according to a ninth embodiment of the invention.

FIG. 12 is a longitudinal cross-sectional view of an automotive air conditioner according to a ninth embodiment of the invention. In FIG. 12, illustration of the instrument panel IP, the cowl Ca, the fire panel Fi, and the floor panel Fl is omitted. The component parts common to those in the first embodiment are designated by identical reference numerals and description thereof is omitted.

In the ninth embodiment, a hole (steering member-accommodating portion) TH formed by a hollow cylindrical portion 72 is located downstream of the heater core 7. A casing 81 is configured such that it can be divided in the front-rear direction BB of the vehicle into a fire panel-side part Fp and an instrument panel-side part Rp with the hole TH accommodating the steering member S as a boundary.

In the ninth embodiment, the instrument panel-side part Rp is formed by a foot duct portion Df and foot outlet f alone.

According to the ninth embodiment, the effects (1), (2), (5), and (6) described above can be obtained.

Figure 13:
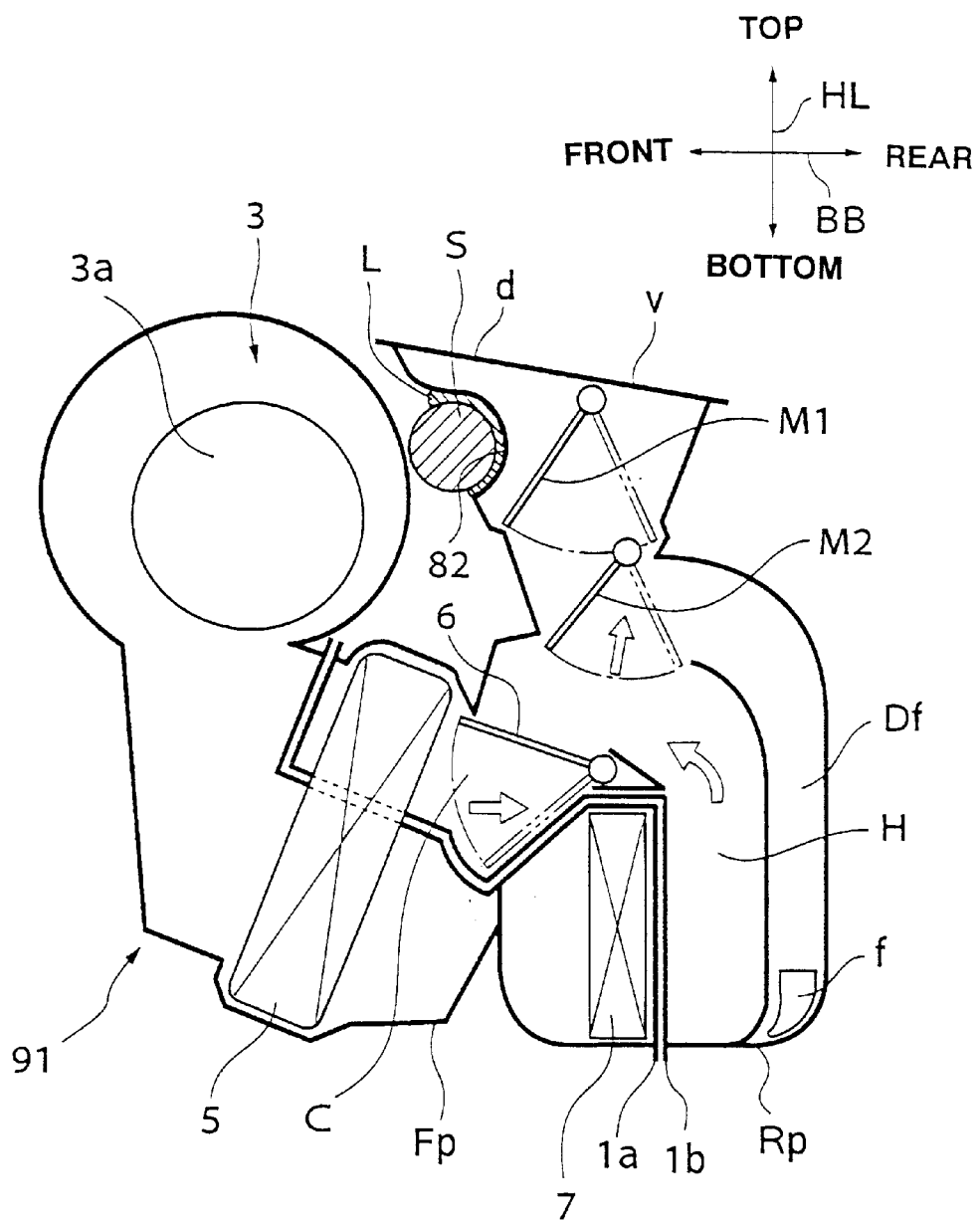
FIG. 13 is a longitudinal cross-sectional view of an automotive air conditioner according to a tenth embodiment of the invention.

FIG. 13 is a longitudinal cross-sectional view of an automotive air conditioner according to a tenth embodiment of the invention. In FIG. 13, illustration of the instrument panel IP, the cowl Ca, the fire panel Fi, and the floor panel Fl is omitted. The component parts common to those in the first embodiment are designated by identical reference numerals and description thereof is omitted.

In the tenth embodiment, a steering member S is received in a recess (steering member-accommodating portion) 82 formed upstream of a defroster outlet d of an instrument panel-side part Rp of a casing 91. By receiving the steering member S in the recess 82, the interference of the steering member S against the casing 91 is avoided.

The casing 91 is configured such that it can be divided in the front-rear direction BB of the vehicle into a fire panel-side part Fp and the instrument panel-side part Rp.

According to the tenth embodiment, the effects (1) to (5), and (7) described above can be obtained.

Figure 14:
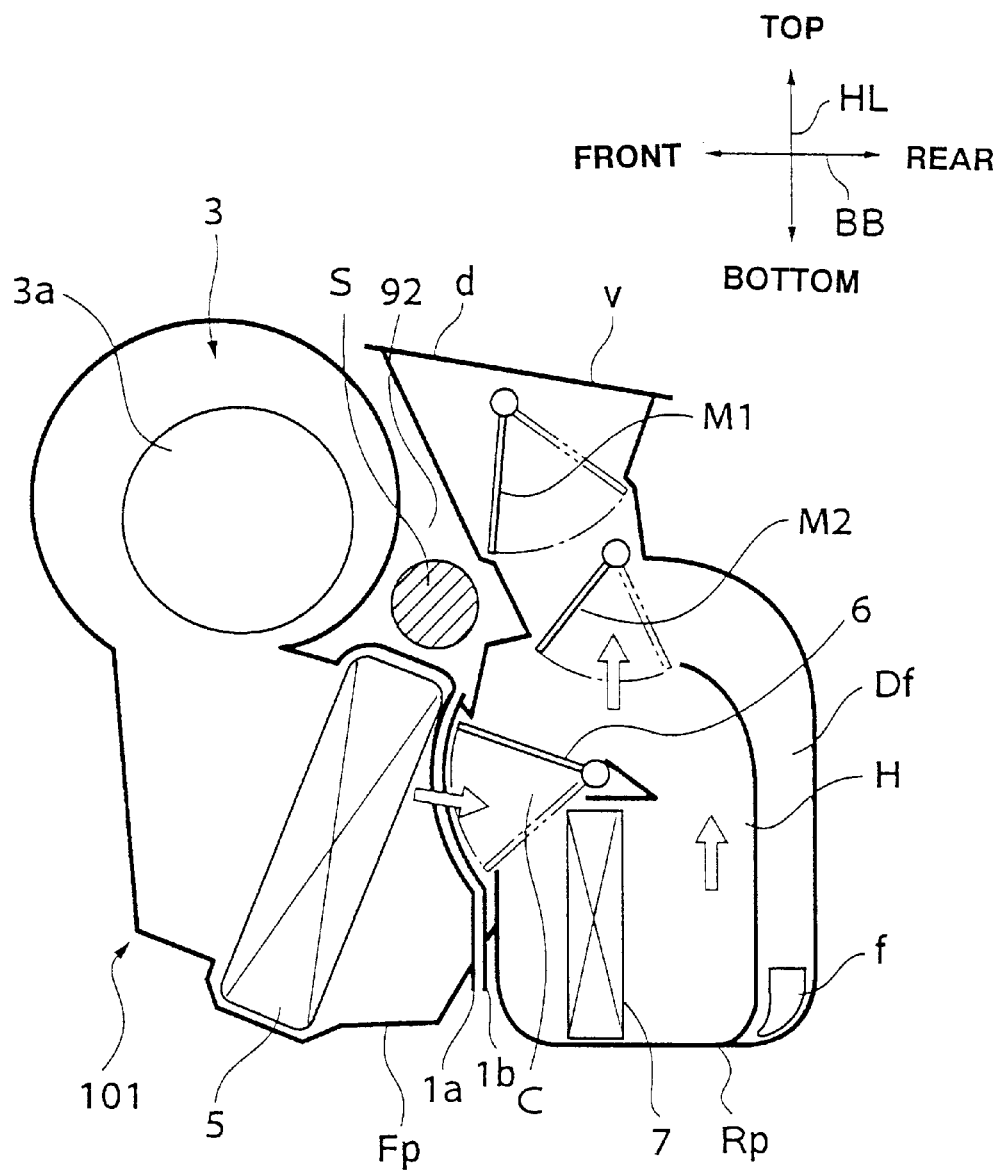
FIG. 14 is a longitudinal cross-sectional view of an automotive air conditioner according to an eleventh embodiment of the invention.

FIG. 14 is a longitudinal cross-sectional view of an automotive air conditioner according to an eleventh embodiment of the invention. In FIG. 14, illustration of the instrument panel IP, the cowl Ca, the fire panel Fi, and the floor panel Fl is omitted. The component parts common to those in the first embodiment are designated by identical reference numerals and description thereof is omitted.

In the eleventh embodiment, a steering member S is arranged in a space (steering member-accommodating portion) 92 formed in a casing 101.

The casing 101 is configured such that it can be divided in the front-rear direction BB of the vehicle into a fire panel-side part Fp and an instrument panel-side part Rp with the space 92 as a boundary.

According to the eleventh embodiment, the effects (1) to (5) described above can be obtained.

Figure 15:
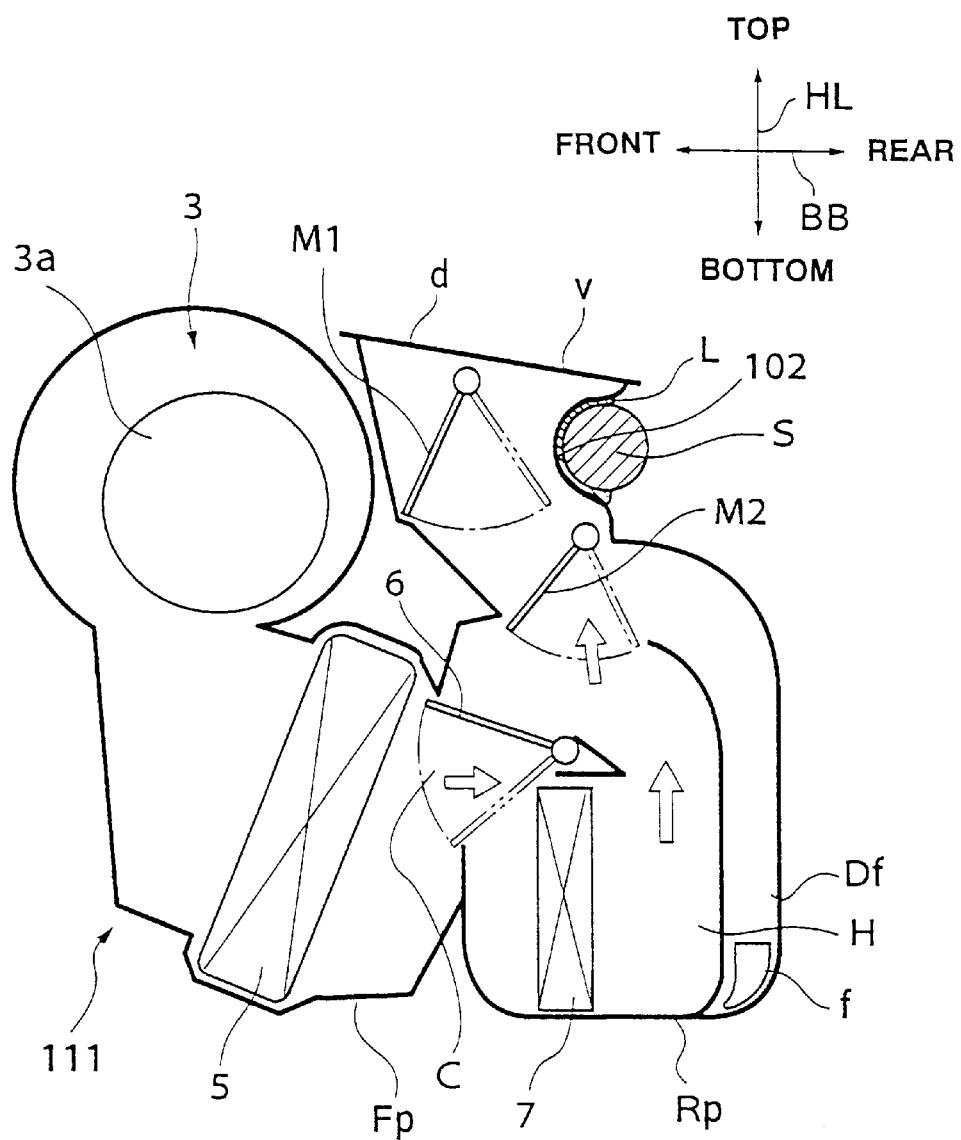
FIG. 15 is a longitudinal cross-sectional view of and automotive air conditioner according to a twelfth embodiment of the invention.

FIG. 15 is a longitudinal cross-sectional view of an automotive air conditioner according to a twelfth embodiment of the invention. In FIG. 15, illustration of the instrument panel IP, the cowl Ca, the fire panel Fi, and the floor panel Fl is omitted. The component parts common to those in the first embodiment are designated by identical reference numerals and description therof is omitted.

In the twelfth embodiment, a steering member S is received in a recess (streering member-accommodating portion) 102 formed upstream of a vent outlet v of an instrument panel-side part Rp of a casing 111. By receiving the steering member S in the reess 102, the interference of the steering member S against the casing 111 is avoided.

In the twelfth embodiment, the casing 111 cannot be divided.

According to the tenth embodiment, the effects (1) described above can be obtained.

Figure 16:
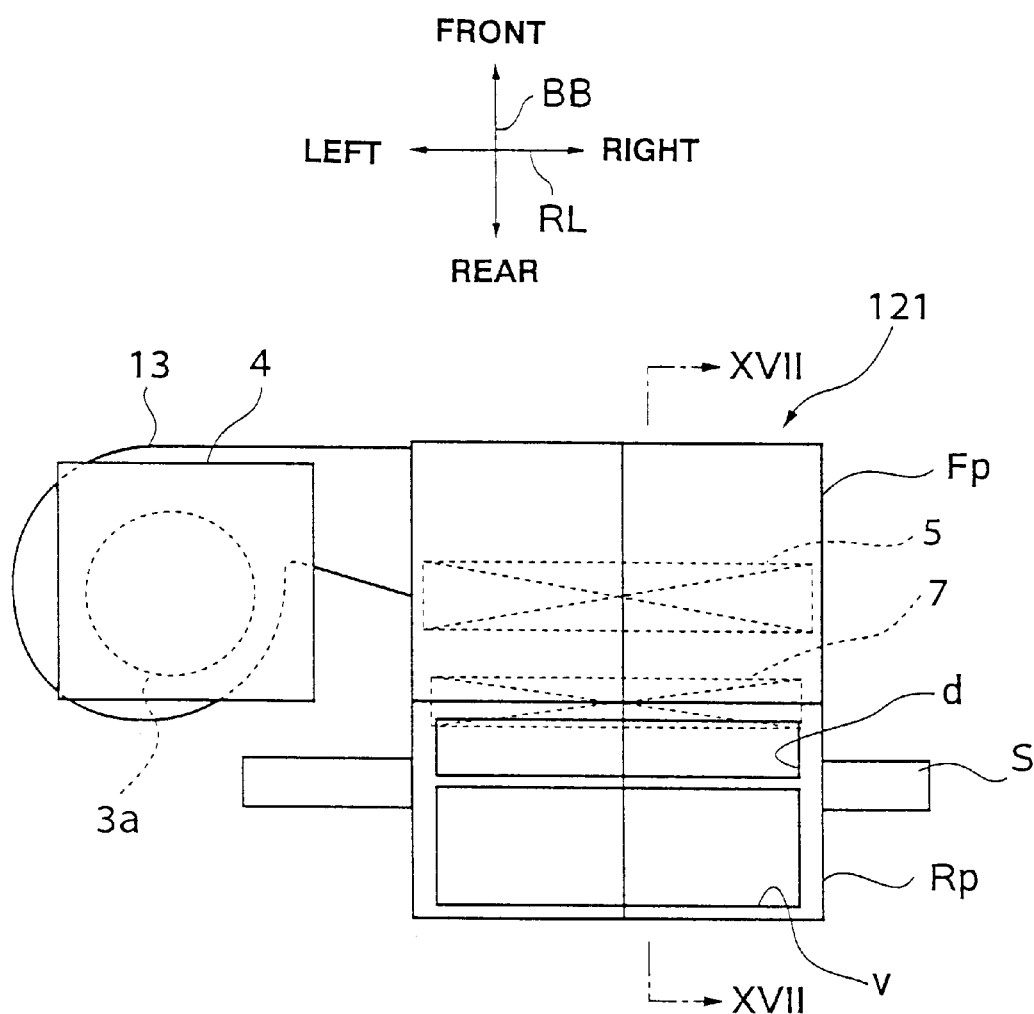
FIG. 16 is a plan view of an automotive air conditioner according to a thirteenth embodiment of the invention.
Figure 17:
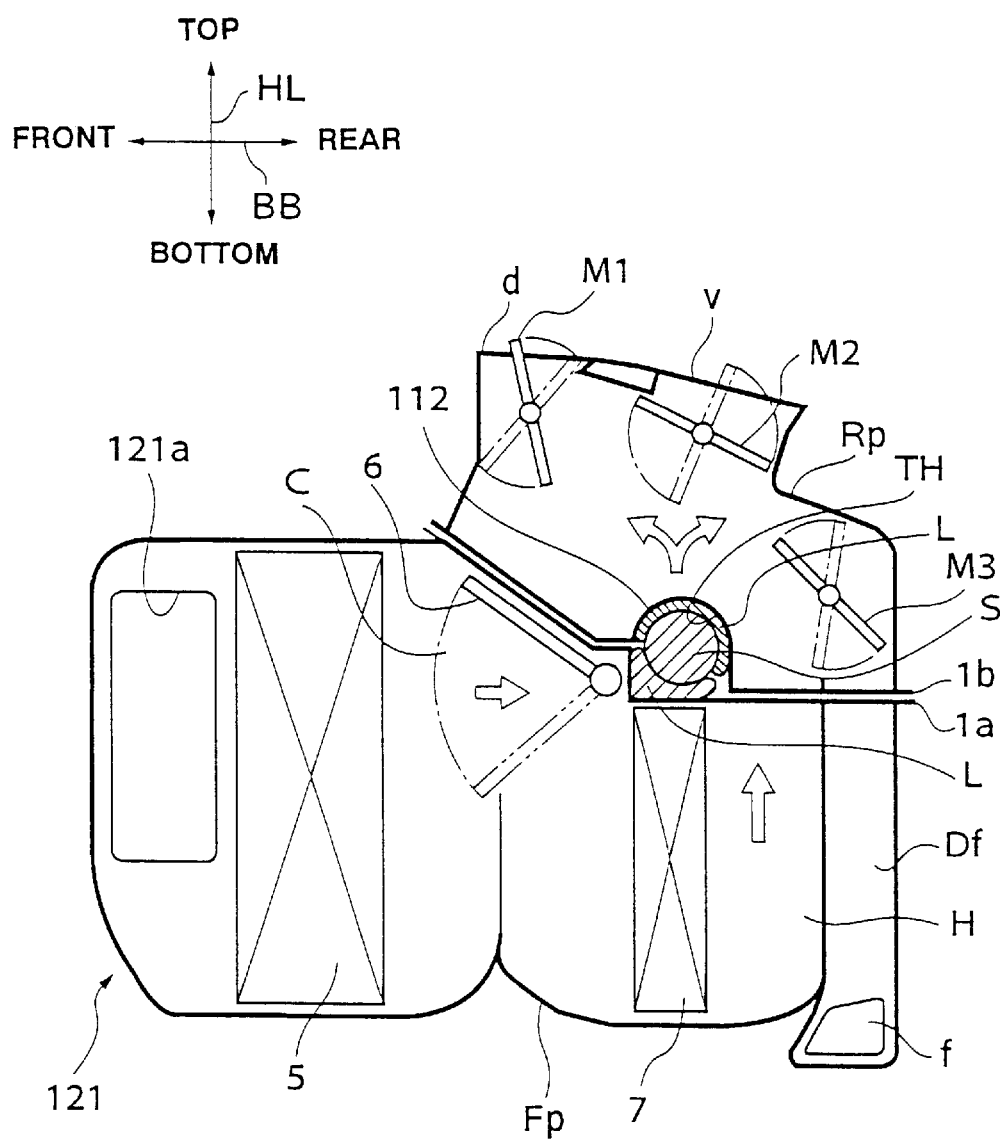
FIG. 17 is a cross-sectional view taken on line XVII—XVII of FIG. 16.

FIG. 16 is a plan view of an automotive air conditioner according to a thirteenth embodiment of the invention. FIG. 17 is a cross-sectional view taken on line XVII—XVII of FIG. 16. In these figures, illustration of the instrument panel IP, the cowl Ca, the fire panel Fi, and the floor panel Fl is omitted. The component parts common to those in the first embodiment are designated by identical reference numerals and description thereof is omitted.

A blower unit 13 is connected to a blower connection port 121a formed in a side face of a casing 121. The configuration for connecting the blower unit 13 as a separate member from the casing to the side face of the casing is common to those in the fourteenth and fifteenth embodiments.

A hole (steering member-accommodating portion) TH formed by a hollow cylindrical portion 112 is located above the heater core 7. The casing 121 is configured such that it can be divided into a fire panel-side part Fp and a instrument panel-side part Rp with the hole TH as a boundary.

A defroster outlet d, a vent outlet v, and a foot outlet f are opened and closed by respective mode doors M1, M2, M3.

According to the thirteenth embodiment, the same effects as provided by the first embodiment can be obtained.

Figure 18:
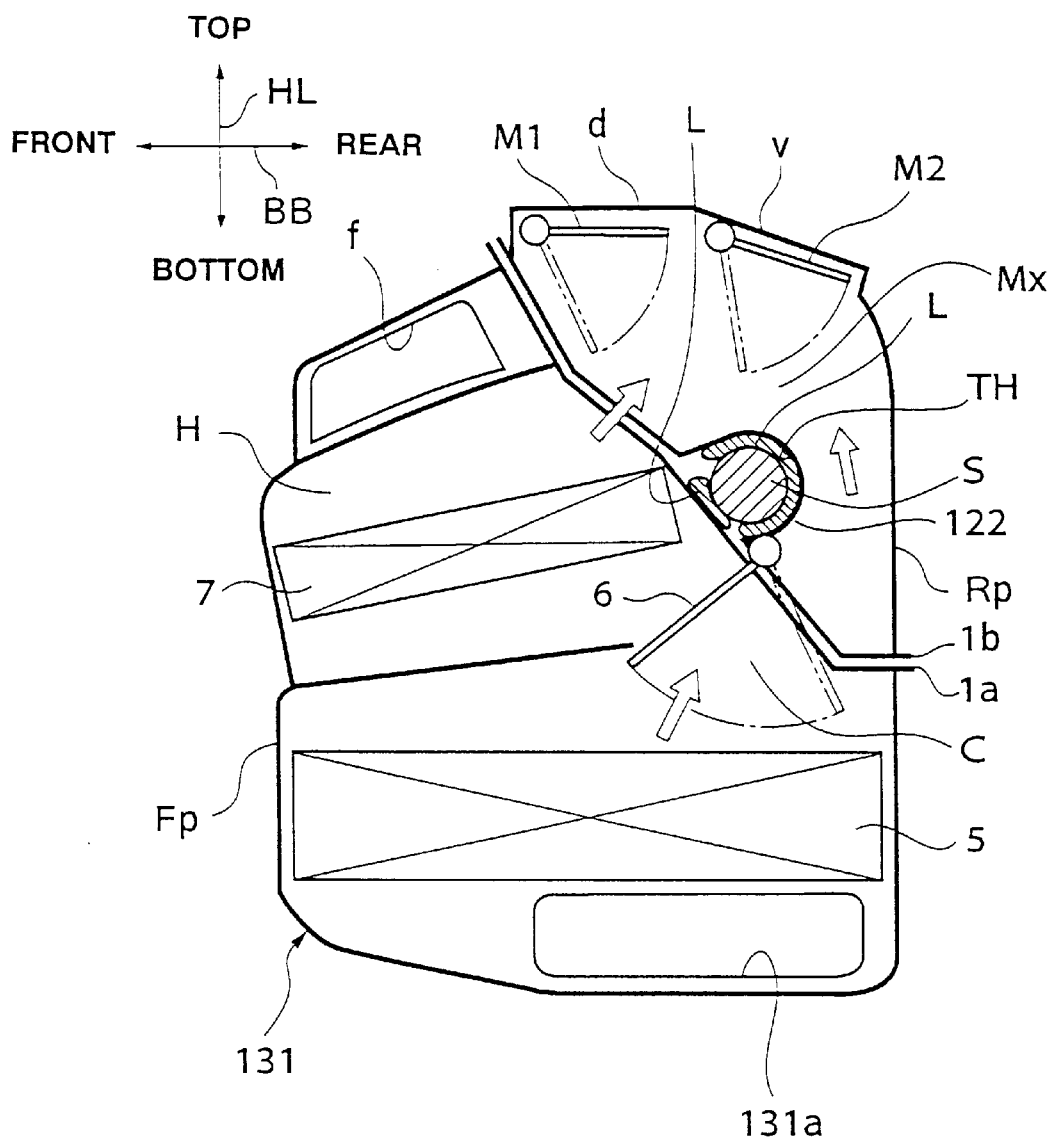
FIG. 18 is a longitudinal cross-sectional view of an automotive air conditioner according to a fourteenth embodiment of the invention.

FIG. 18 is a longitudinal cross-sectional view of an automotive air conditioner according to a fourteenth embodiment of the invention. In FIG. 18, illustration of the instrument panel IP, the cowl Ca, the fire panel Fi, and the floor panel Fl is omitted. The component parts common to those in the first embodiment are designated by identical reference numerals and description thereof is omitted.

The fourteenth embodiment is distinguished from the thirteenth embodiment in that the evaporator 5 and the heater core 7 are arranged in the vertical direction HL of the vehicle, and a blower connection port 131a of a casing 131 is located below the evaporator 5.

In the fourteenth embodiment, air conditioner components accommodated within the casing 131, such as the evaporator 5, the air-mixing door 6, the heater core 7, and the mode doors M1, M2, are classified from the viewpoint of maintainability (systematically classified) into groups, whereby the evaporator 5 and the heater core 7 belonging to piping-related air conditioner components (first group) are assigned to a fire panel-side part Fp, while the air-mixing door 6, and the mode doors M1, M2 belonging to mechanism-related air conditioner components (second group) are assigned to an instrument panel-side part Rp. In this respect, this embodiment is common to the fifth embodiment.

A hole (steering member-accommodating portion) TH formed by a hollow cylindrical portion 122 is located within an air-mixing space MX. The casing 131 is configured such that it can be divided into the fire panel-side part Fp and the instrument panel-side part Rp with the hole TH as a boundary. The blower unit is connected to a blower connection port 131a of the casing 131.

According to the fourteenth embodiment, the same effects as provided by the fifth embodiment described above can be obtained.

Figure 19:
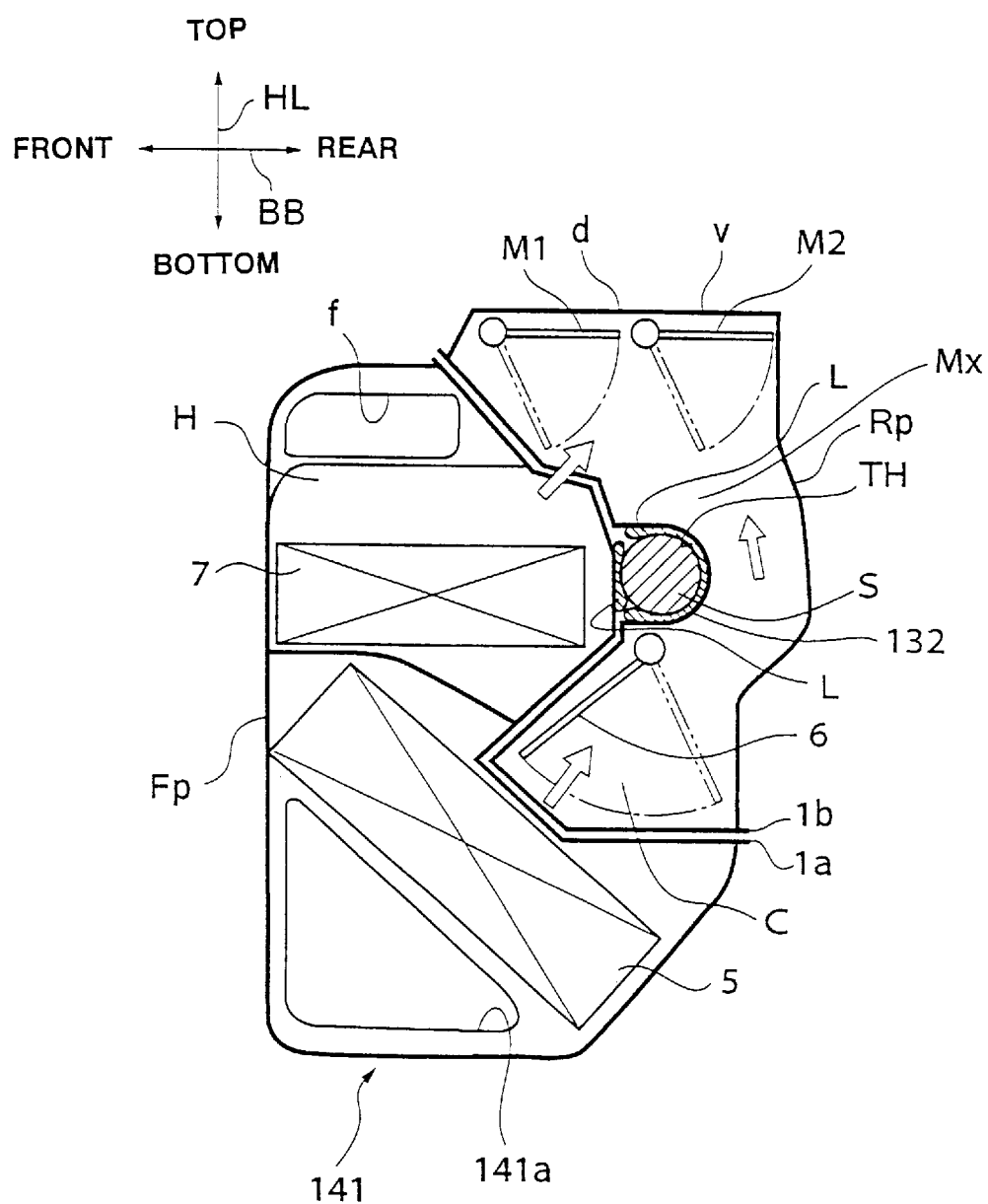
FIG. 19 is a cross-sectional view of an automotive air conditioner according to a fifteenth embodiment of the invention.

FIG. 19 is a longitudinal cross-sectional view of an automotive air conditioner according to a fifteenth embodiment of the invention. In FIG. 19, illustration of the instrument panel IP, the cowl Ca, the fire panel Fi, and the floor panel Fl is omitted. The component parts common to those in the first embodiment are designated by identical reference numerals and description thereof is omitted.

The construction of the fifteen embodiment is substantially the same as the fourteenth embodiment.

A hole (steering member-accommodating portion) TH formed by a hollow cylindrical portion 132 is located within an air-mixing space MX. A casing 141 is configured such that it can be divided into a fire panel-side part Fp and an instrument panel-side part Rp with the hole TH as a boundary. The blower unit is connected to a blower connection port 141a of the casing 141.

According to the fifteenth embodiment, the same effects as provided by the fifth embodiment can be obtained.

Figure 20:
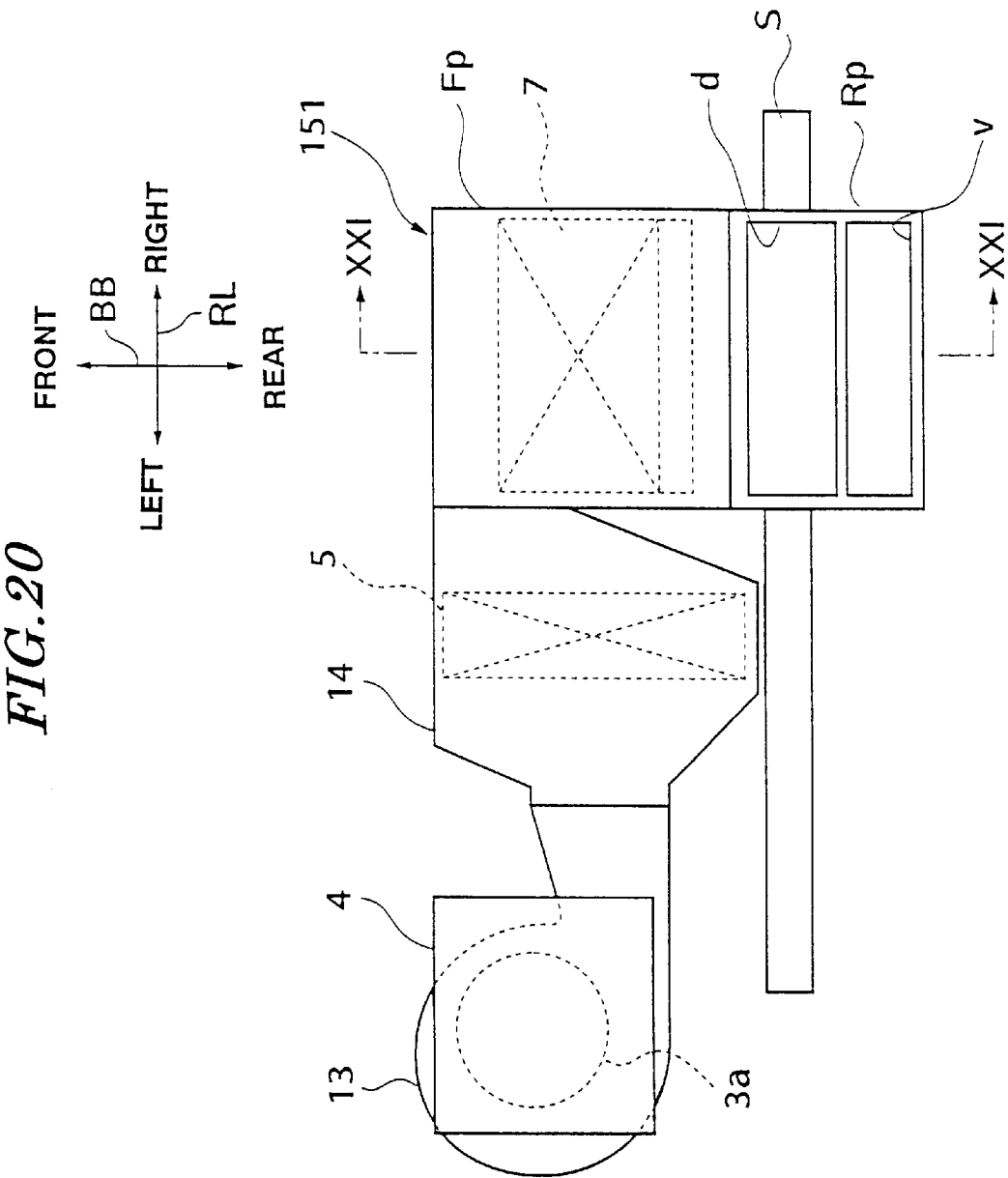
FIG. 20 is a plan view of an automotive air conditioner according to a sixteenth embodiment of the invention.
Figure 21:
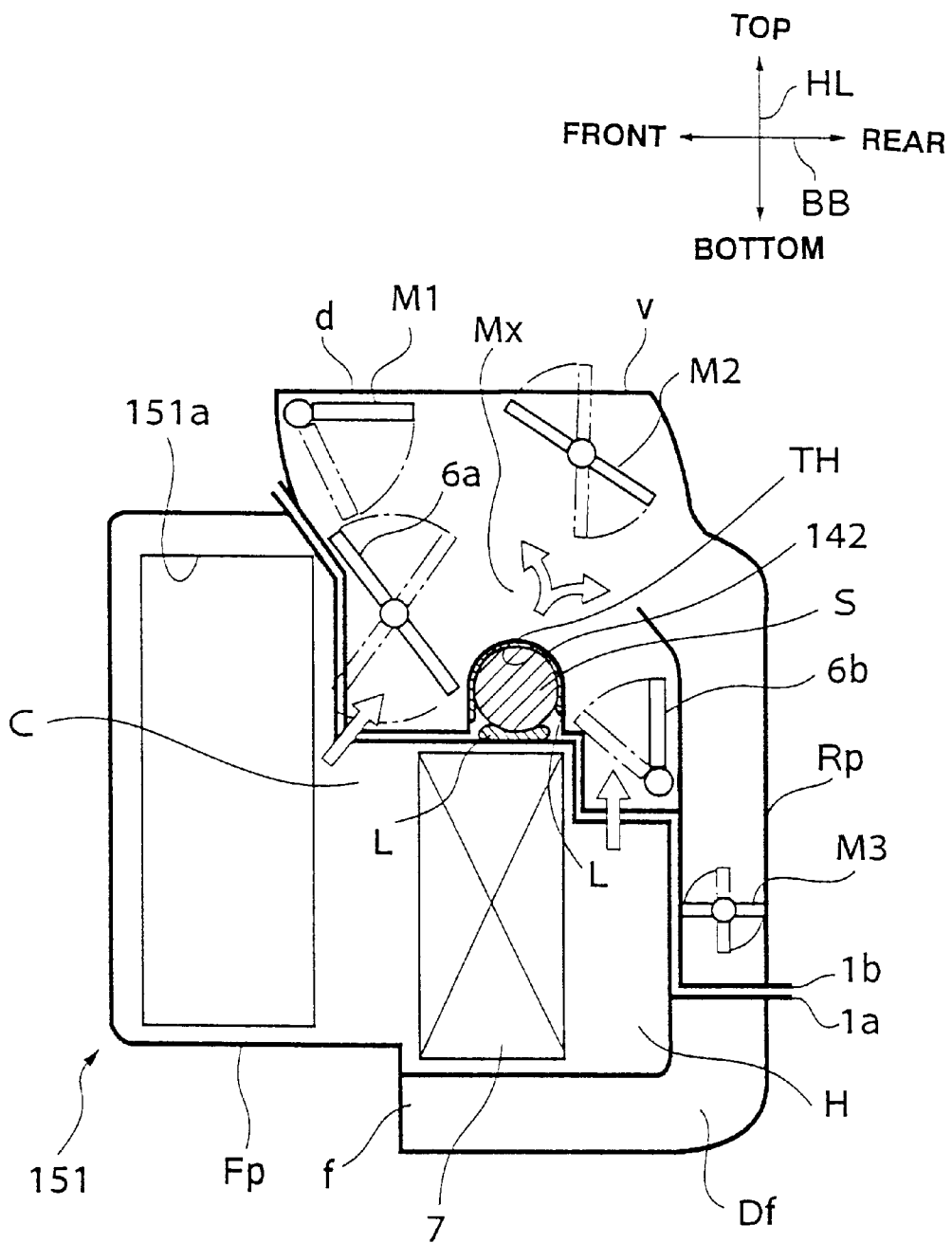
FIG. 21 is a cross-sectional view taken on line XXI—XXI of FIG. 20.

FIG. 20 is a plan view of an automotive air conditioner according to a sixteenth embodiment of the invention. FIG. 21 is a cross-sectional view taken on line XXI—XXI of FIG. 20.

A cooler unit 14 including the evaporator 5 is connected to a cooler connection port 151a formed in a side face of a casing 151, and a blower unit 13 is connected to a blower connection port, not shown, formed in a side face of the cooler unit 14.

Air conditioner components accommodated within the casing 151, such as the air-mixing doors 6a, 6b, the heater core 7 and the mode doors M1, M2, are classified from the viewpoint of maintainability (systematically classified) into groups, whereby the heater core 7 belonging to piping-related air conditioner components (first group) are assigned to a fire panel-side part Fp, while the air-mixing doors 6a, 6b, and the mode doors M1, M2 belonging to mechanism-related air conditioner components (second group) are assigned to an instrument panel-side part Rp.

A hole (steering member-accommodating portion) TH formed by a hollow cylindrical portion 142 is located within an air-mixing space MX. The casing 151 is configured such that it can be divided into the fire panel-side part Fp and the instrument panel-side part Rp with the hole TH as a boundary. The blower unit 13 is connected to a blower connection port 151a of the casing 151.

According to the sixteenth embodiment, the same effects as provided by the fifth embodiment can be obtained.

Figure 22:
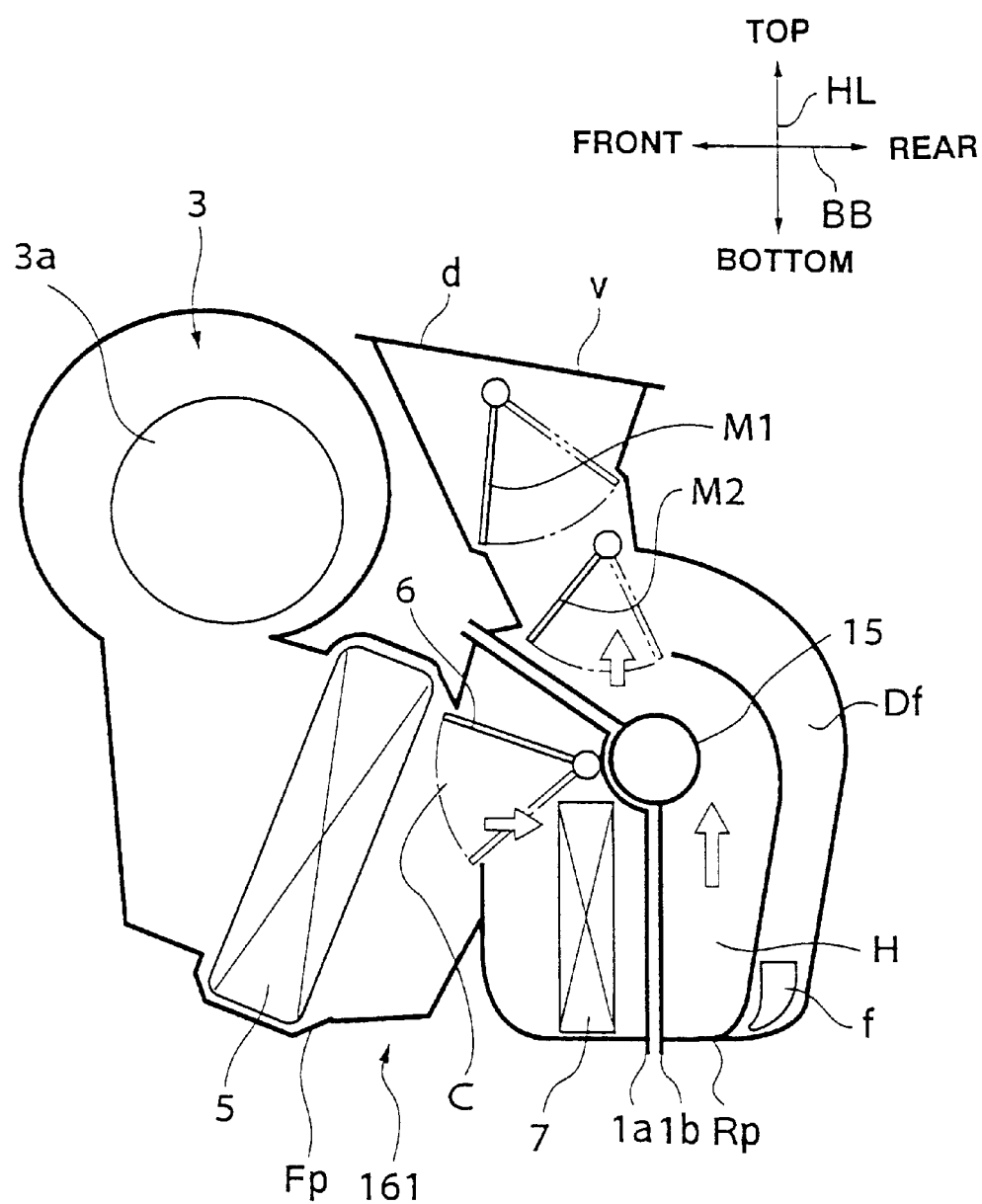
FIG. 22 is a longitudinal cross-sectional view of an automotive air conditioner according to a seventeenth embodiment of the invention.
Figure 24:
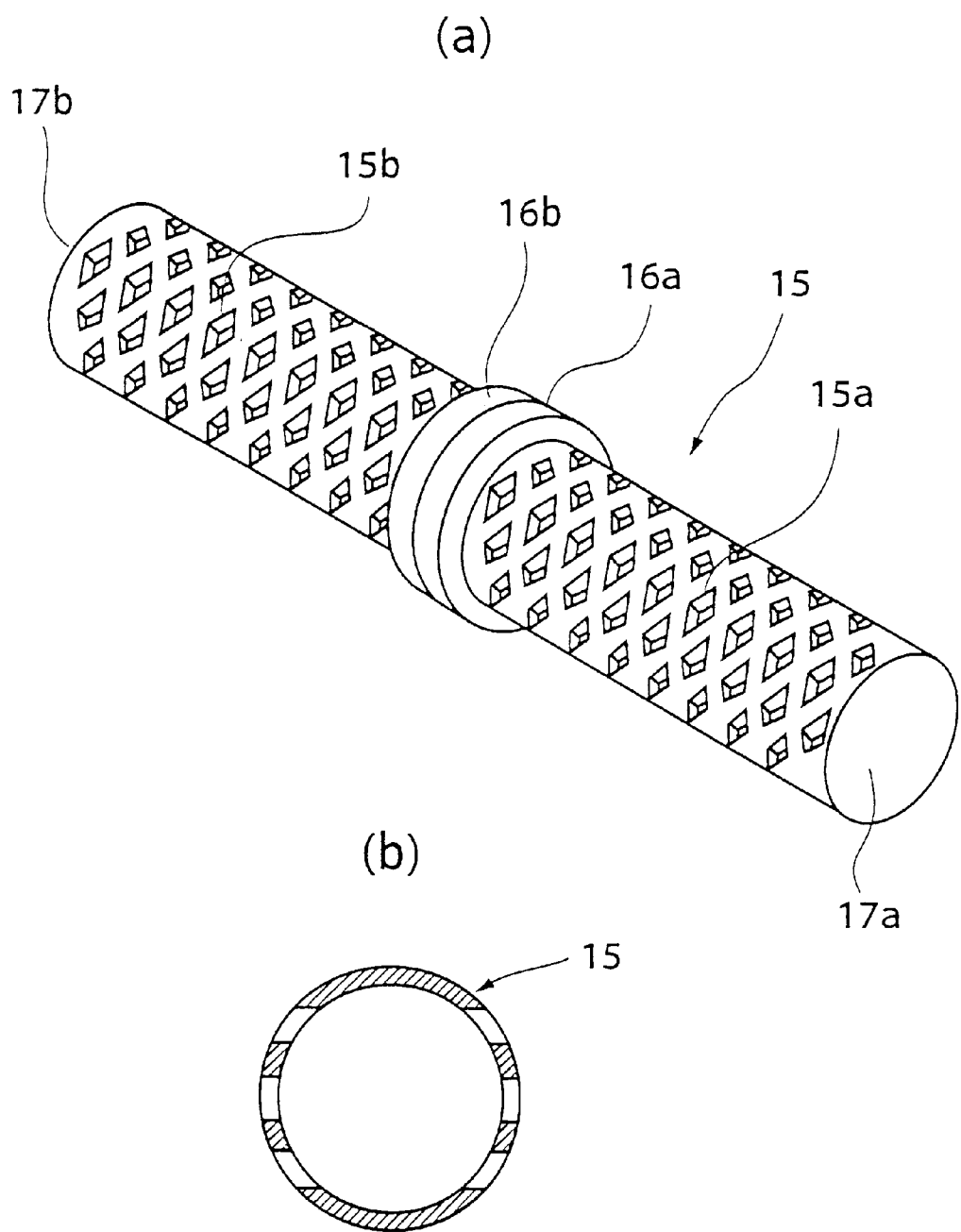
FIG. 24(a) is a perspective view of a rigid portion of a casing.
FIG. 24(b) is a transverse cross-sectional view of the rigid portion.

FIG. 22 is a longitudinal cross-sectional view of an automotive air conditioner according to a seventeenth embodiment of the invention. FIG. 23(a) is a side view of an instrument panel-side part, and FIG. 23(b) is a view of the instrument panel-side part as viewed from a fire panel side. FIG. 24(a) is a perspective view of a rigid portion of a casing, and FIG. 24(b) is a transverse cross-sectional view of the rigid portion. In these figures, illustration of the instrument panel IP, the cowl Ca, the fire panel Fi, and the floor panel Fl is omitted. The component parts common to those in the first embodiment are designated by identical reference numerals and description thereof is omitted.

The seventeen embodiment is common to the seventh embodiment shown in FIG. 10 except that the rigid portion 15 forming part of the steering member S is integrally formed with the casing 161.

Now, portions of the present embodiment different from these of the FIG. 10 seventh embodiment will be described.

The rigid portion 15 in the form of a meshed hollow cylinder made of a synthetic resin is integrally formed with a fire panel-side part Fp of a casing 161. The rigid portion 15 has hollow cylindrical portions 15a, 15b and a flange 16a of the hollow cylindrical portion 15a is connected to a flange 16b of the hollow cylindrical portion 15b, with screws. Air can pass through the rigid portion 15 due to the meshed structure thereof. Therefore, the resistance of the steering member to the flow of air can be decreased. The rigid portion 15 has opposite ends thereof closed by respective flat portions 17a, 17b, and holds one end face of a steering member (not shown) mounted on an instrument panel IP.

According to the seventeenth embodiment, the same advantageous effects as provided by the first embodiment can be obtained, and there is no limitation in the order of operations for mounting the steering member and the casing (effects (8)).

Figure 25:
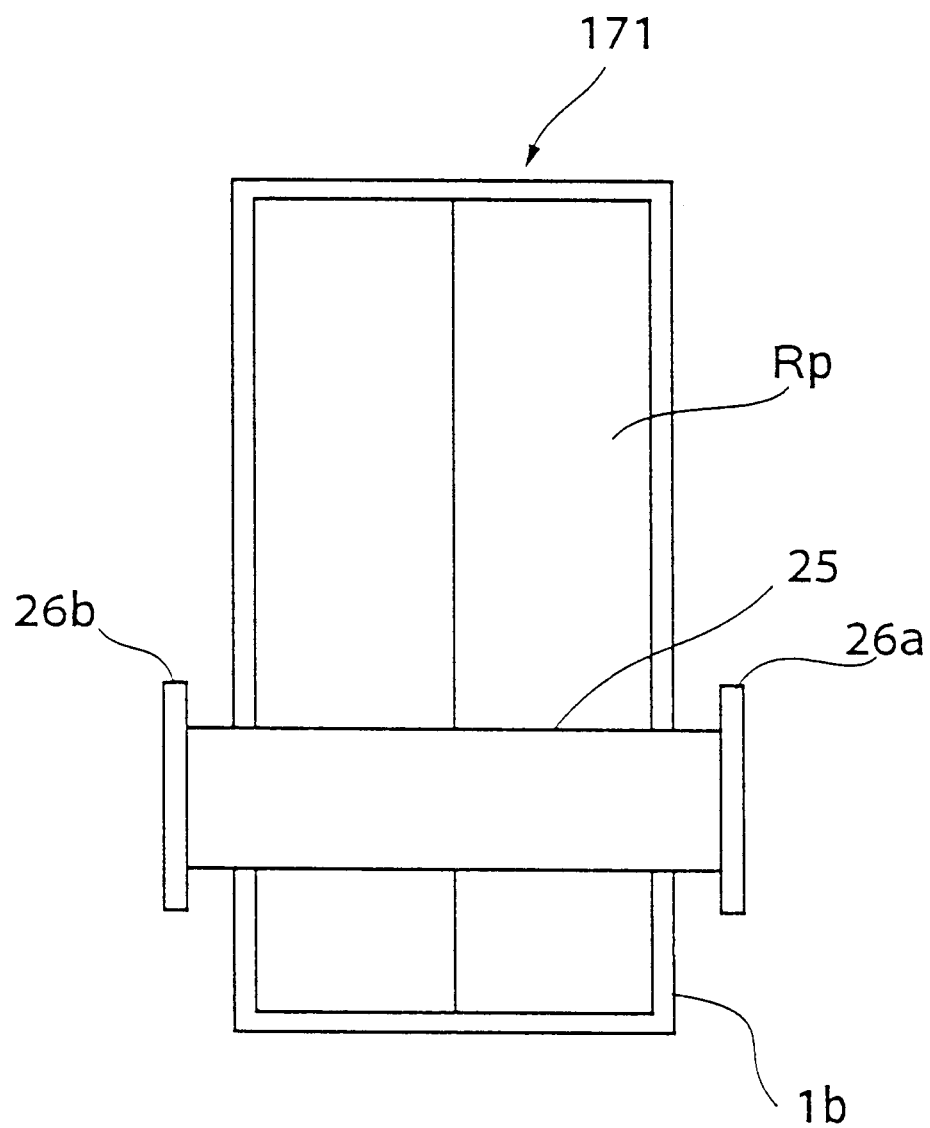
FIG. 25 is a view of an instrument panel-side part of an automotive air conditioner according to an eighteenth embodiment of the invention as viewed from a fire panel-side part.

FIG. 25 is a view of an instrument panel-side part of an automotive air conditioner according to an eighteenth embodiment of the invention as viewed from a fire panel side.

The eighteenth embodiment is distinguished from the seventeenth embodiment in that a steering member component part in the form of a hollow cylinder made of steel as a rigid portion 25 forming part of the steering member S is integrally incorporated in a casing 171.

The rigid portion 25 has opposite ends thereof formed with flanges 26a, 26b.

The steering member (not shown) mounted on the instrument panel IP also has one end thereof formed with a flange.

When assemblage, both the flanges 26a, 26b are abutted on each other, and then connected with screws.

According to the eighteenth embodiment, the same advantageous effects as provided by the seventeenth embodiment can be obtained.

Figure 26:
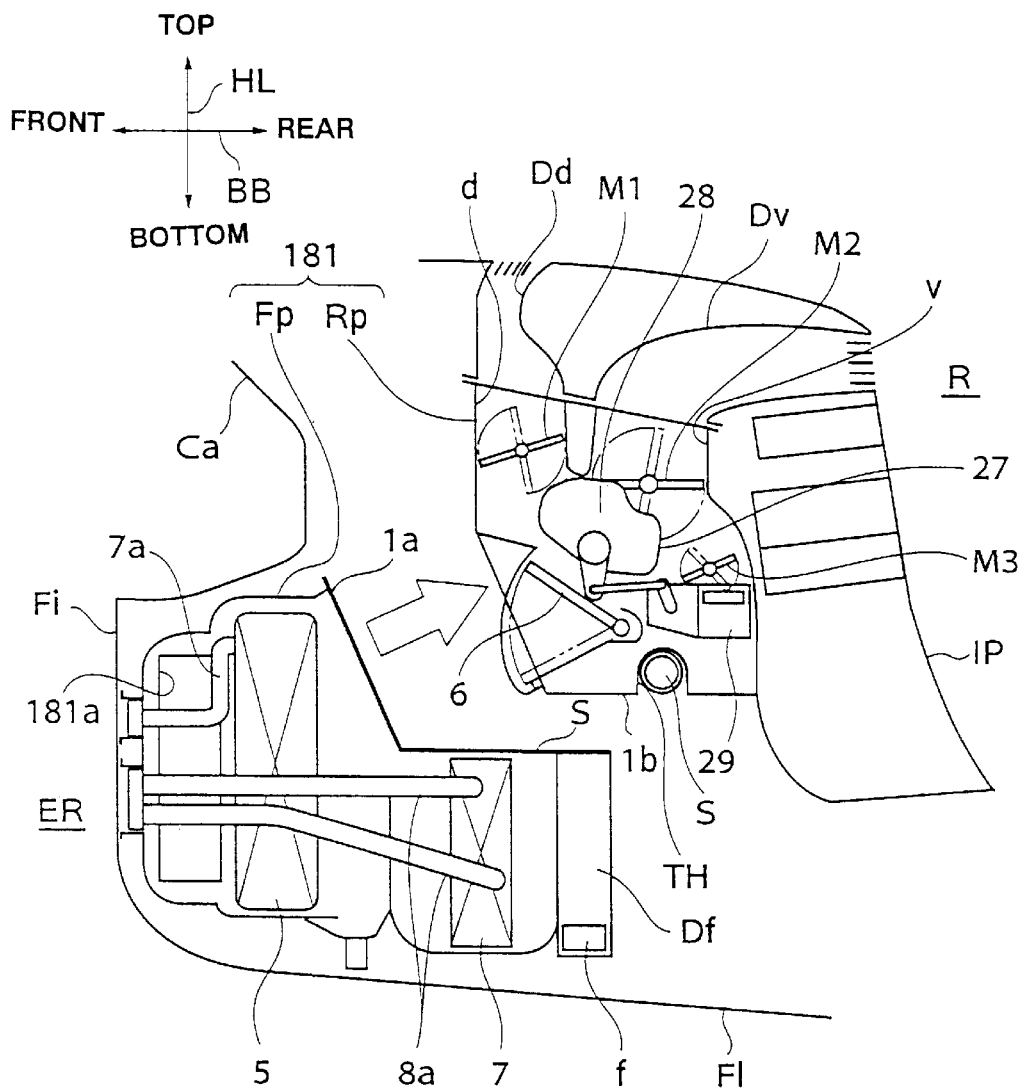
FIG. 26 is a view showing a separated state of an instrument panel module according to a nineteenth embodiment of the invention.
Figure 27:
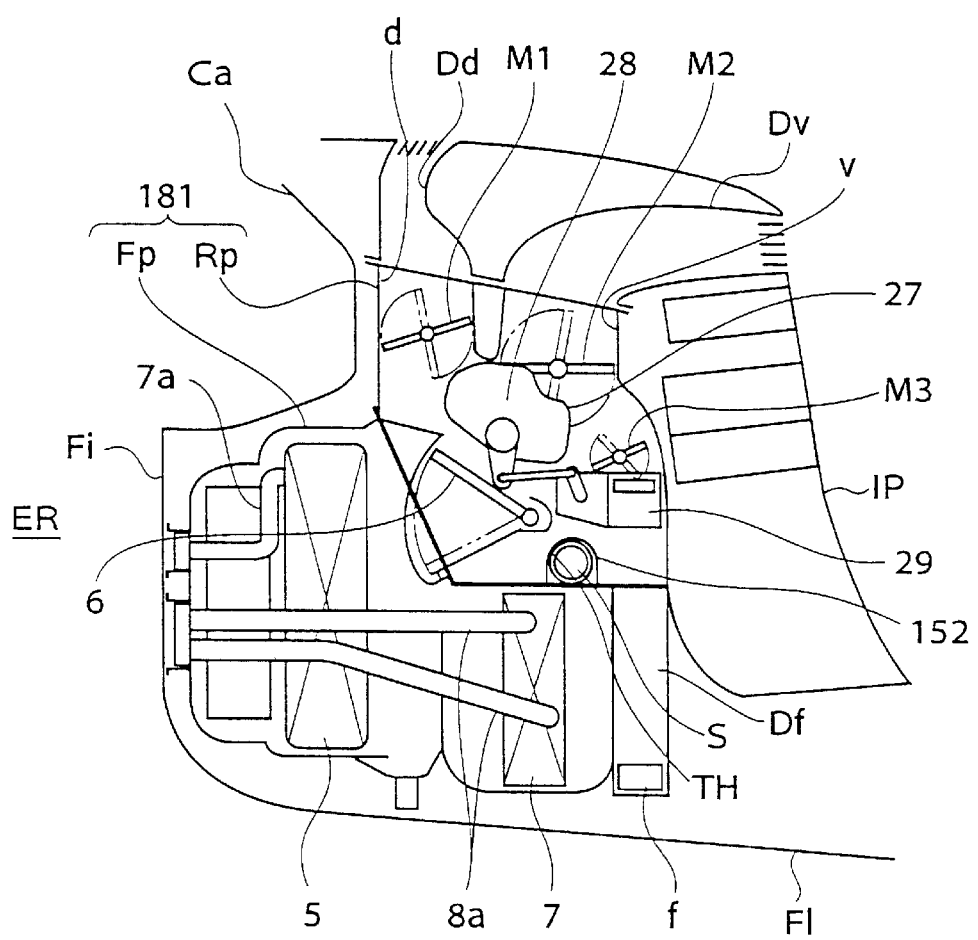
FIG. 27 is a view showing an assembled state of an instrument panel module.

FIG. 26 is a longitudinal cross-sectional view showing a separated state of an instrument panel module according to a nineteenth embodiment of the invention, and FIG. 27 is a view showing an assembled state of the instrument panel module. The component parts common to those in the first embodiment are designated by identical reference numerals and description thereof is omitted.

The nineteenth embodiment is characterized in that an instrument panel-side part Rp of a casing 181 is integrally connected to an instrument panel IP to form the module.

A hole (steering member-accommodating portion) TH formed by a hollow cylindrical portion 152 is located above a heater core 7. The casing 181 is configured such that it can be divided into a fire panel-side part Fp and the instrument panel-side part Rp with the hole TH as a boundary.

The fire panel-side part Fp and the instrument panel-side part Rp are brought into firm contact with each other via a sealing member, such as a urethane resin, and connected to each other by fixing means, such as screws.

Air conditioner components accommodated within the casing 18, such as the evaporator 5, the air-mixing door 6a, the heater core 7, and the mode doors M1, M2, M3 are classified in this embodiment from the viewpoint of maintainability (systematically classified) into groups, whereby the evaporator 5 and the heater core 7 belonging to piping-related air conditioner components (first group) are assigned to the fire panel-side part Fp, while the air-mixing door 6, the mode doors M1, M2, M3, and a drive mechanism 27 belonging to mechanism-related air conditioner components (second group) are assigned to the instrument panel-side part Rp.

The evaporator 5 has a refrigerant pipe 7a connected thereto, and the heater core 7 has a hot water pipe 8a connected thereto. The refrigerant pipe 7a and the hot water pipe 8a are connected to a refrigerant pipe and a hot water pipe (not shown), respectively, on a vehicle production line.

The air-mixing door 6 is opened and closed by the drive mechanism 27.

The drive mechanism 27 comprises a lever 28 for transmitting a driving force to the mode doors M1, M2, M3 and an actuator 29 for driving the lever 28.

To remove the instrument panel-side part Rp, first, the fixing means, such as screws, connecting the instrument panel-side part Rp and the fire panel-side part Fp are removed.

Then, an instrument panel IP is pulled backward in the front-rear direction BB of the vehicle. This separates the instrument panel-side part Rp from the fire panel-side part Fp. However, the fire panel-side part remains on the vehicle, and only the instrument panel-side part Rp is moved together with the instrument panel IP.

Since only the instrument panel-side part alone can be removed together with the instrument panel IP while allowing the fire panel-side part Fp to remain on the vehicle, as described above, the burden on the workers can be reduced.

According to the nineteenth embodiment, the above effects (1) and (4) to (7) can be obtained, and further it is possible to obtain the following effects:

Since the instrument panel-side part Rp of the casing 181 is integrally connected to the instrument panel IP, the workability on the vehicle production line is improved, and at the same time the components mounted on the vehicle can be reduced in size and weight (effects (9)).

INDUSTRIAL APPLICABILITY

As described heretofore, the automotive air conditioner and the instrument panel module according to the present invention are useful as an automotive air conditioner and an instrument panel module which can cope with a change in the mounting location of a steering member.

What is claimed is:

1. An automotive air conditioner comprising:
    a casing having at least one of air-introducing means for introducing air, blowing means for blowing the air from said air-introducing means, cooling means for cooling the air introduced by said blowing means from said air-introducing means, heating means for heating the air introduced by said blowing means from said air-introducing means, and air-distributing means for distributing the cooled air or the heated air; and
    a steering member-accommodating portion formed in said casing, for accommodating a steering member extending in a right-left direction of a vehicle,
    wherein said casing can be divided at least into an instrument panel-side part adjacent to an instrument panel and a fire panel-side part adjacent to a fire panel.

2. An automotive air conditioner comprising:
    a casing having at least one of air-introducing means for introducing air, blowing means for blowing the air from said air-introducing means, cooling means for cooling the air introduced by said blowing means from said air-introducing means, heating means for heating the air introduced by said blowing means from said air-introducing means, and air-distributing means for distributing the cooled air or the heated air; and
    a steering member interference-avoiding portion formed in said casing, for avoiding interference with a steering member extending in a right-left direction of a vehicle,
    wherein said casing can be divided at least into an instrument panel-side part adjacent to an instrument panel and a fire panel-side part adjacent to a fire panel.

3. An automotive air conditioner comprising:
    a casing having at least one of air-introducing means for introducing air, blowing means for blowing the air from said air-introducing means, cooling means for cooling the air introduced by said blowing means from said air-introducing means, heating means for heating the air introduced by said blowing means from said air-introducing means, and air-distributing means for distributing the cooled air or the heated air; and
    a steering member-arranging space portion formed in said casing, for arranging therein a steering member extending in a right-left direction of a vehicle,
    wherein said casing can be divided at least into an instrument panel-side part adjacent to an instrument panel and a fire panel-side part adjacent to a fire panel.

4. An automotive air conditioner according to claim 1, wherein said steering member-accommodating portion is a hole extending through said casing in the right-left direction of the vehicle or a recess formed in an outer surface of said casing in the right-left direction of the vehicle.

5. An automotive air conditioner according to claim 2, wherein said steering member interference-avoiding portion is a hole extending through said casing in the right-left direction of the vehicle or a recess formed in an outer surface of said casing in the right-left direction of the vehicle.

6. An automotive air conditioner according to claim 3, wherein said steering member-arranging space portion is a hole extending through said casing in the right-left direction of the vehicle or a recess formed in an outer surface of said casing in the right-left direction of the vehicle.

7. An automotive air conditioner according to claim 1, wherein said instrument panel-side part can be removed in one direction.

8. An automotive air conditioner according to claim 2, wherein said instrument panel-side part can be removed in one direction.

9. An automotive air conditioner according to claim 3, wherein said instrument panel-side part can be removed in one direction.

10. An automotive air conditioner according to claim 4, wherein said instrument panel-side part can be removed in one direction.

11. An automotive air conditioner according to claim 5, wherein said instrument panel-side part can be removed in one direction.

12. An automotive air conditioner according to claim 6, wherein said instrument panel-side part can be removed in one direction.

13. An automotive air conditioner according to claim 1, wherein air conditioner components including said cooling means, said heating means, and said air-distributing means are systematically classified into groups, and
    wherein ones of said air conditioner components belonging to a first group are assigned to said instrument panel-side part, and ones of said air conditioner components belonging to a second group are assigned to said fire panel-side part.

14. An automotive air conditioner according to claim 2, wherein air conditioner components including said cooling means, said heating means, and said air-distributing means are systematically classified into groups, and
    wherein ones of said air conditioner components belonging to a first group are assigned to said instrument panel-side part, and ones of said air conditioner components belonging to a second group are assigned to said fire panel-side part.

15. An automotive air conditioner according to claim 3, wherein air conditioner components including said cooling means, said heating means, and said air-distributing means are systematically classified into groups, and
    wherein ones of said air conditioner components belonging to a first group are assigned to said instrument panel-side part, and ones of said air conditioner components belonging to a second group are assigned to said fire panel-side part.

16. An automotive air conditioner according to claim 4, wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

17. An automotive air conditioner according to claim 5, wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

18. An automotive air conditioner according to claim 6, wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

19. An automotive air conditioner according to claim 1, wherein said instrument panel-side part can be removed in one direction, and wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

20. An automotive air conditioner according to claim 2, wherein said instrument panel-side part can be removed in one direction, and wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

21. An automotive air conditioner according to claim 3, wherein said instrument panel-side part can be removed in one direction, and wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

22. An automotive air conditioner according to claim 4, wherein said instrument panel-side part can be removed in one direction, and wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

23. An automotive air conditioner according to claim 5, wherein said instrument panel-side part can be removed in one direction, and wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

24. An automotive air conditioner according to claim 6, wherein said instrument panel-side part can be removed in one direction, and wherein air conditioner components including said cooling means, said heating means, and said air-distributing means are systematically classified into groups, and wherein ones of said air conditioner components belonging to a first group are assigned to said instrument panel-side part, and ones of said air conditioner components belonging to a second group are assigned to said fire panel-side part.

25. An automotive air conditioner according to claim 1, wherein said fire panel-side part is commonly usable in a plurality of kinds of vehicles, and said instrument panel-side part is usable for only a specific kind of vehicles.

26. An automotive air conditioner according to claim 2, wherein said fire panel-side part is commonly usable in a plurality of kinds of vehicles, and said instrument panel-side part is usable for only a specific kind of vehicles.

27. An automotive air conditioner according to claim 3, wherein said fire panel-side part is commonly usable in a plurality of kinds of vehicles, and said instrument panel-side part is usable for only a specific kind of vehicles.

28. An automotive air conditioner according to claim 4, wherein said fire panel-side part is commonly usable in a plurality of kinds of vehicles, and said instrument panel-side part is usable for only a specific kind of vehicles.

29. An automotive air conditioner according to claim 5, wherein said fire panel-side part is commonly usable in a plurality of kinds of vehicles, and said instrument panel-side part is usable for only a specific kind of vehicles.

30. An automotive air conditioner according to claim 6, wherein said fire panel-side part is commonly usable in a plurality of kinds of vehicles, and said instrument panel-side part is usable for only a specific kind of vehicles.

31. An automotive air conditioner having a cooling heat exchanger and a heater arranged within a unit casing sequentially from a front side of a vehicle toward a rear side of the vehicle, wherein said unit casing is formed with an interference avoiding portion for avoiding interference with a steering member extending in a right-left direction of the vehicle, and wherein said unit casing is divided into a front casing part and a rear casing part using said interference avoiding portion as a boundary.

32. An automotive air conditioner according to claim 31, wherein said cooling heat exchanger is accommodated within said front casing part, and said heater is accommodated within said rear casing part, said interference avoiding portion forming a hole extending through said unit casing in the right-left direction of the vehicle, said interference avoiding portion being located in an air passage extending from said cooling heat exchanger to said heater at a substantially intermediate location with respect to a vertical direction of the vehicle.

33. An automotive air conditioner according to claim 31, wherein an air-mixing door is arranged between said cooling heat exchanger and said heater, said air-mixing door being accommodated within said rear casing part, said front casing part and said rear casing part each permitting division into a right part and a left part with respect to the right-left direction of the vehicle, a pair of the parts forming said rear casing part being fixed in a vicinity of said interference avoiding means in the right-left direction of the vehicle by fixing means.

34. An automotive air conditioner according to claim 32, wherein an air-mixing door is arranged between said cooling heat exchanger and said heater, said air-mixing door being accommodated within said rear casing part, said front casing part and said rear casing part each permitting division into a right part and a left part with respect to the right-left direction of the vehicle, a pair of the parts forming said rear casing part being fixed in a vicinity of said interference avoiding means in the right-left direction of the vehicle by fixing means.

* * * * *